United States Patent [19]

Goodman

[11] Patent Number: 5,036,809
[45] Date of Patent: Aug. 6, 1991

[54] CIRCULAR ROTARY ENGINE

[75] Inventor: William A. Goodman, League City, Tex.

[73] Assignee: Cir-Com Development Corp., Houston, Tex.

[21] Appl. No.: 406,698

[22] Filed: Sep. 13, 1989

[51] Int. Cl.⁵ .............................................. F02B 53/00
[52] U.S. Cl. ....................................... 123/241; 418/68
[58] Field of Search .................... 123/45 R, 45 A, 241; 418/68

[56] References Cited

U.S. PATENT DOCUMENTS

| 845,973 | 3/1907 | Pape | 418/68 X |
| 908,916 | 1/1909 | Weinat | 418/68 X |
| 2,896,590 | 7/1959 | Bush et al. | 418/68 |
| 3,667,876 | 6/1972 | Boyd | 418/68 |

FOREIGN PATENT DOCUMENTS

| 274940 | 6/1914 | Fed. Rep. of Germany | 418/68 |
| 2139926 | 4/1973 | Fed. Rep. of Germany | 418/68 |
| 597743 | 2/1948 | United Kingdom | 418/68 |

Primary Examiner—Michael Koczo
Attorney, Agent, or Firm—Kenneth A. Roddy

[57] ABSTRACT

A circular rotary engine comprises a housing having spaced concentric cylindrical walls defining an annulus therebetween with intake and exhaust ports through the sides of the walls and a cylindrical rotary piston ring having multiple symmetrically undulating surfaces on both ends and coaxial interior and exterior gears for shaft drive which rotates within the annulus while reciprocating between end ring members positioned within the annulus and secured at each end of the interior and exterior walls. The end rings have opposite facing undulating frontal surfaces symmetrical with the undulating frontal surface of the rotary piston such that the piston ring surfaces cooperate with the end ring surfaces to alternately create a volume area and displace the volume area in some portion during rotation, thus alternately opening a series of chambers on one end of the rotary piston while displacing chambers on the opposite end with the reciprocating movement during axial rotation of the rotary piston responding in motion against the symmetric frontal surfaces of the end rings. This motion is accomplished while maintaining frontal surface contact at all times, without restriction to rotation whereby frontal surface seal contact is maintained during axial reciprocation and rotary movement. All components are coaxial thus providing the rotary piston with controlled circular axial rotation within the annulus with the end ring members controlling reciprocation.

34 Claims, 16 Drawing Sheets

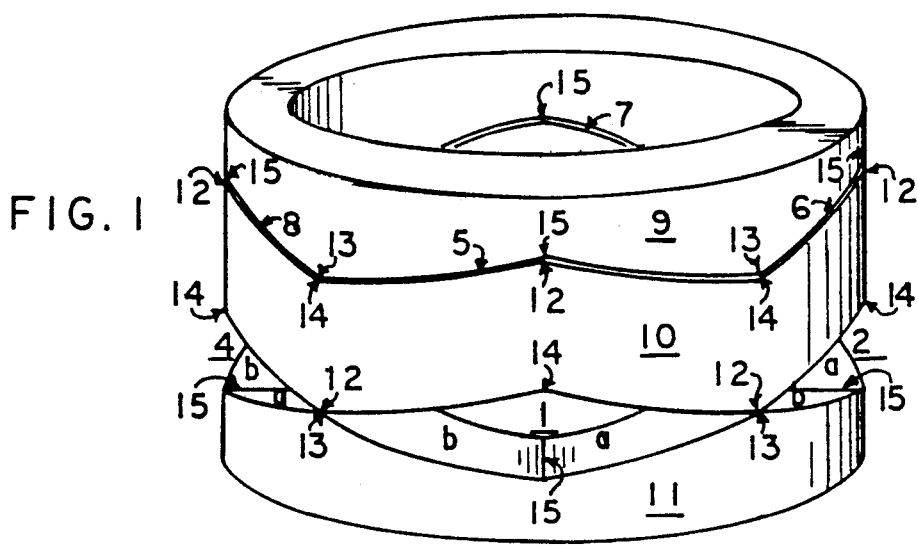
FIG. 1
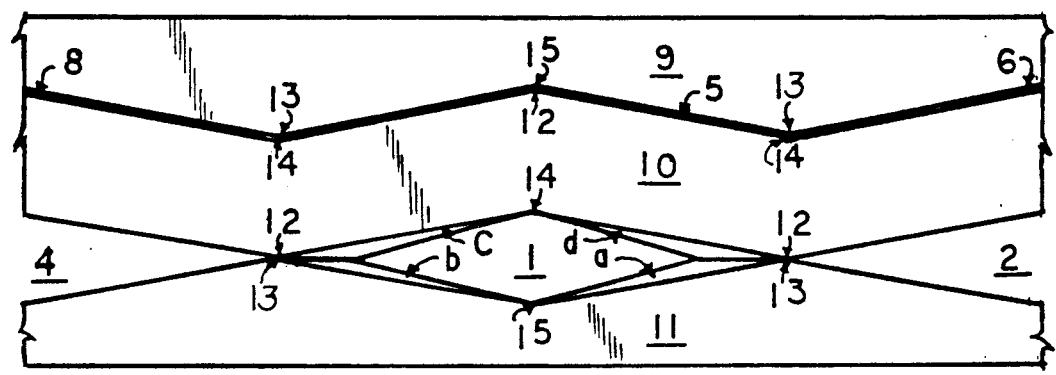
FIG. 1-A
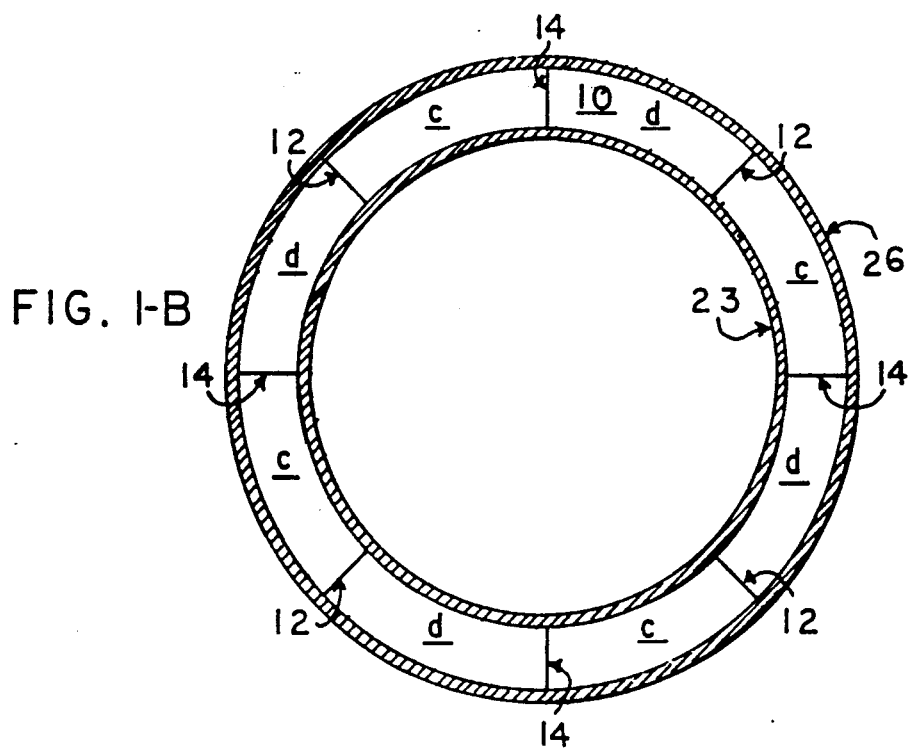
FIG. 1-B

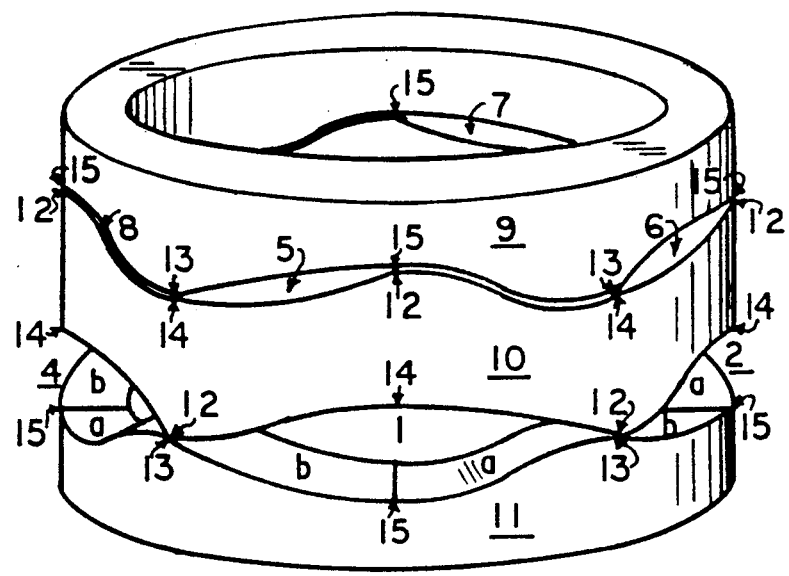
FIG. 2
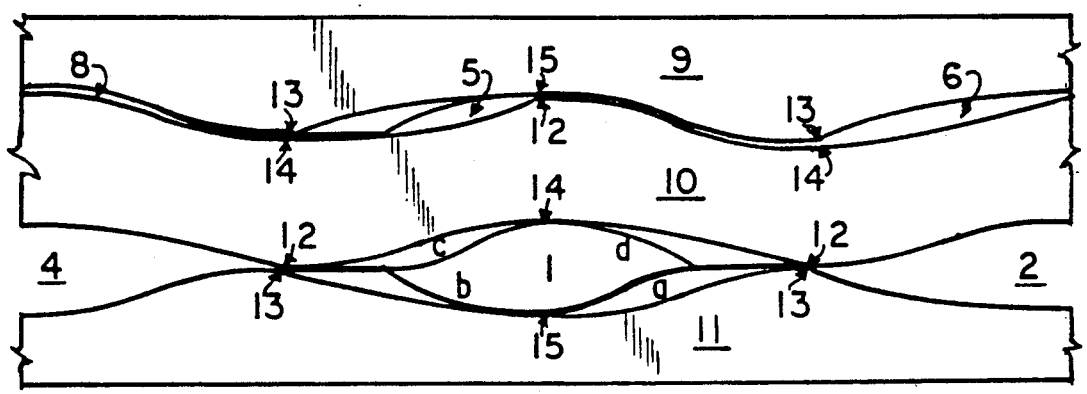
FIG. 2-A
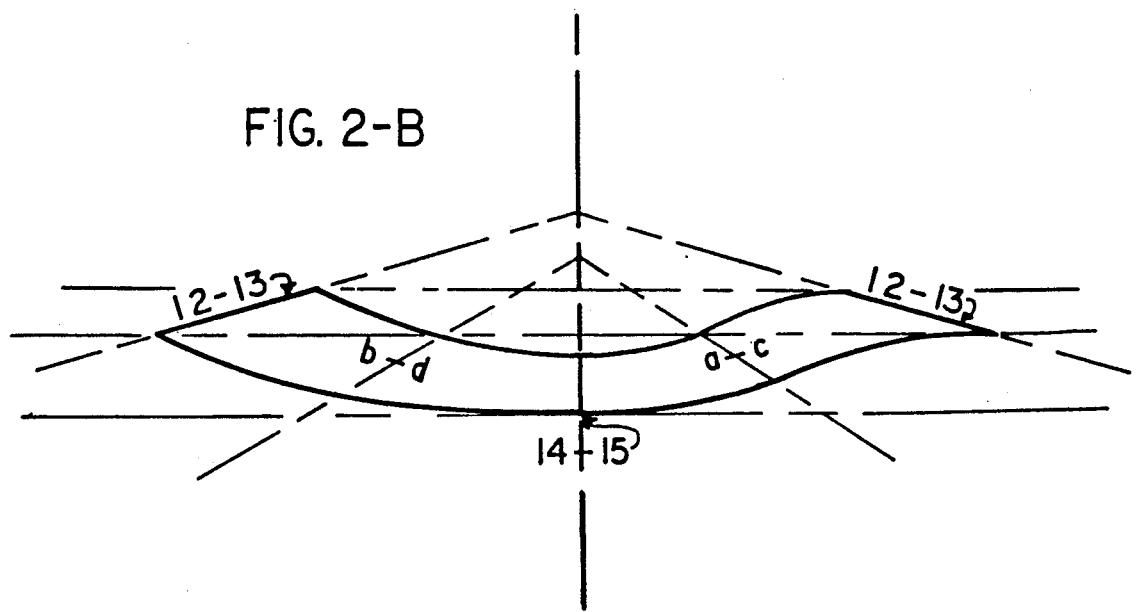
FIG. 2-B

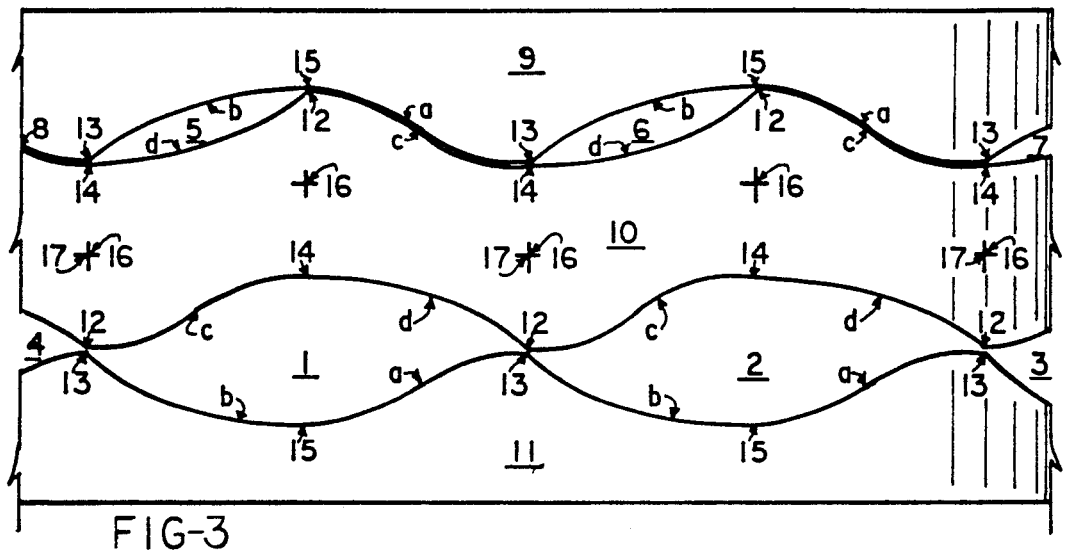
FIG-3
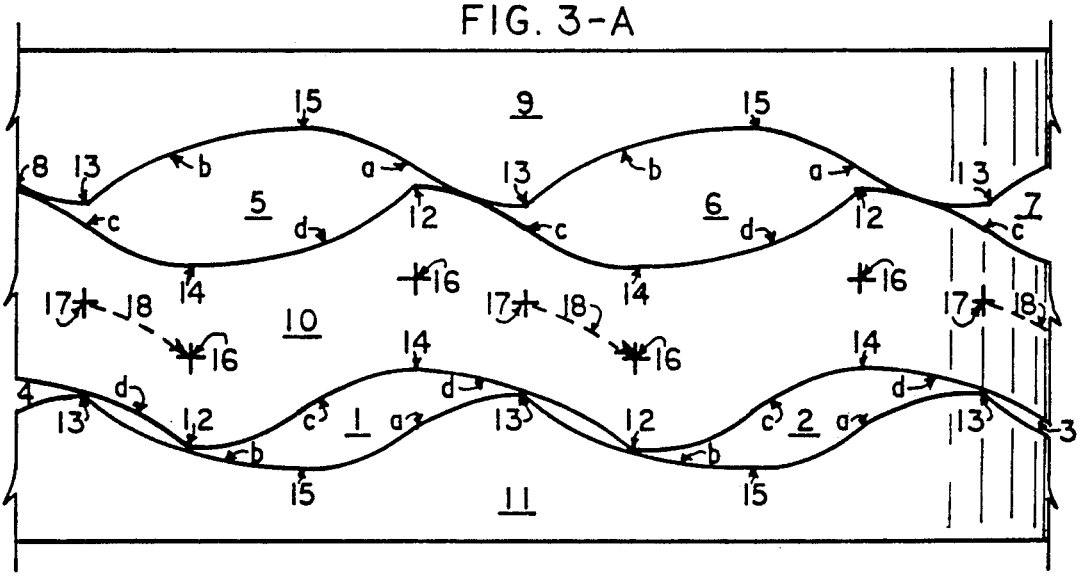
FIG. 3-A
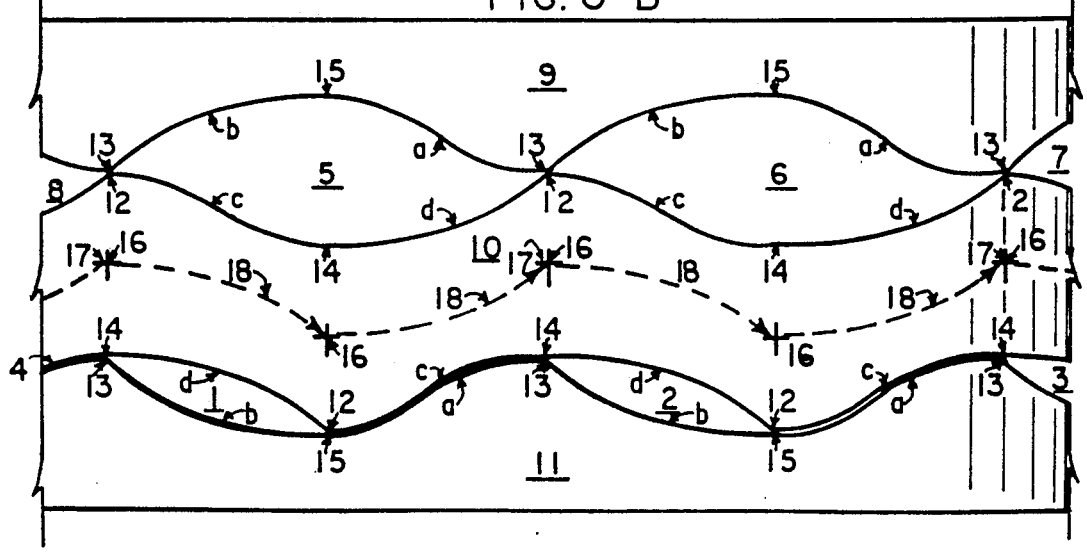
FIG. 3-B

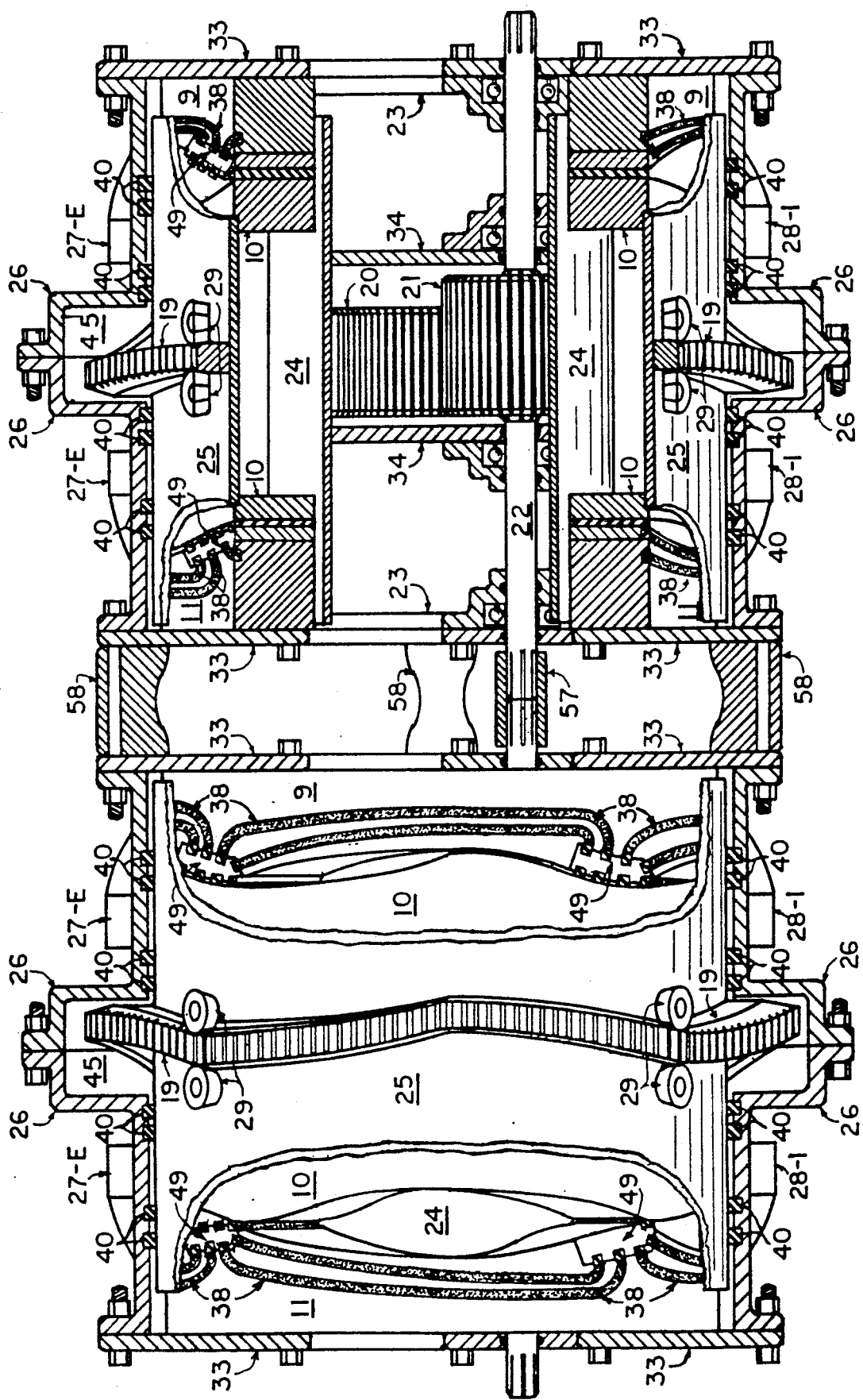

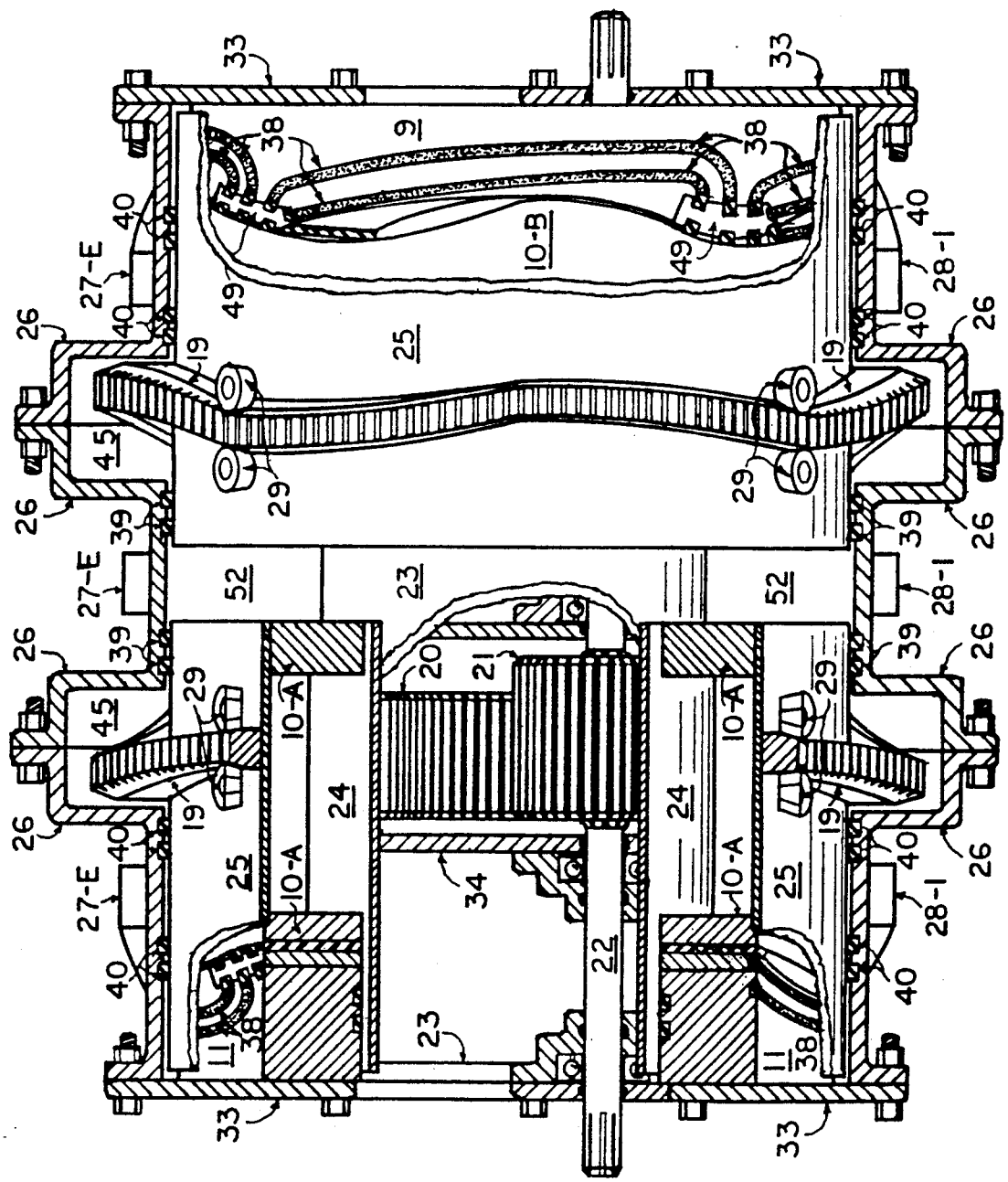

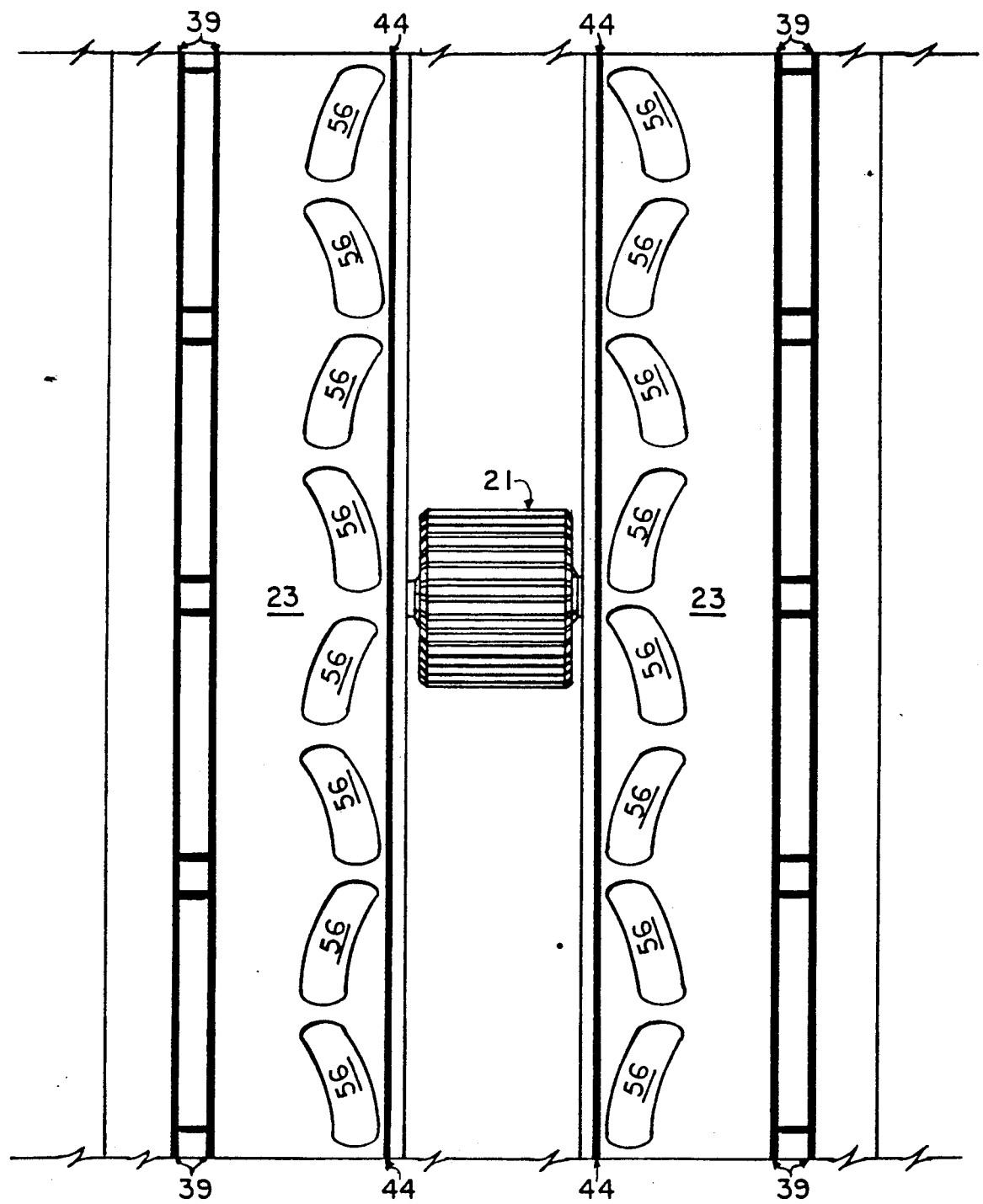
FIG. 8-A

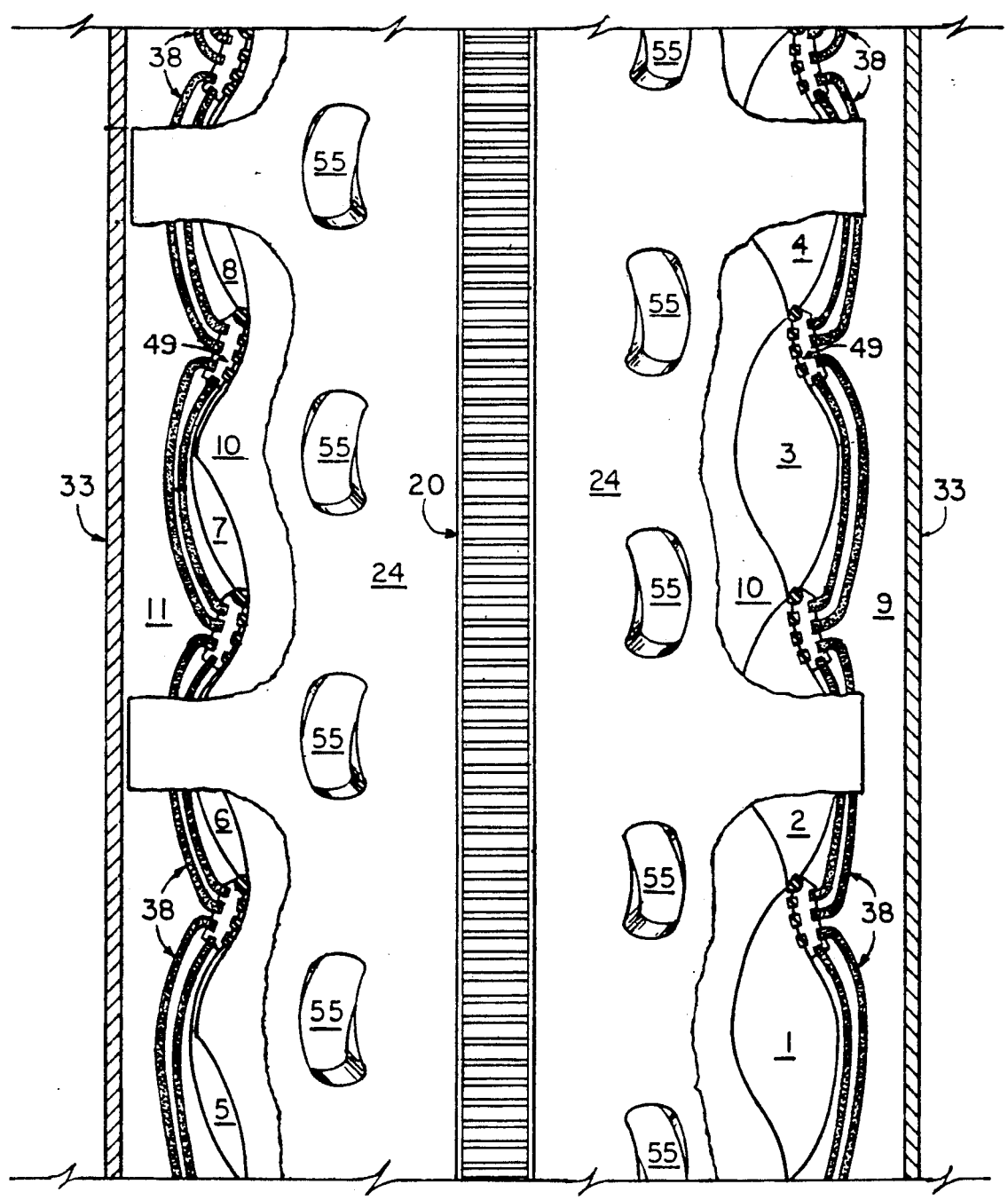
FIG. 9-A

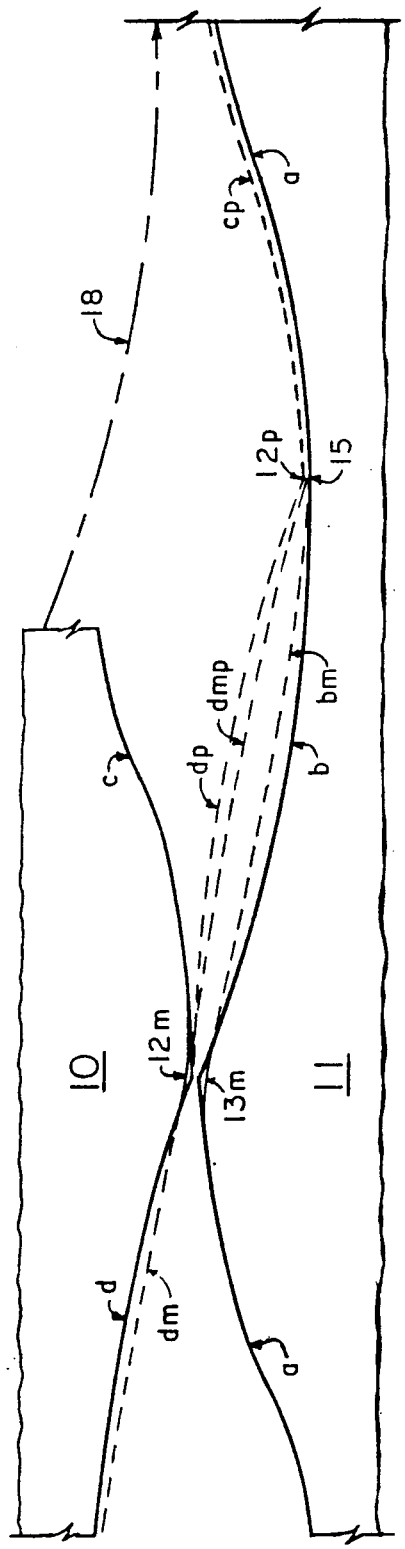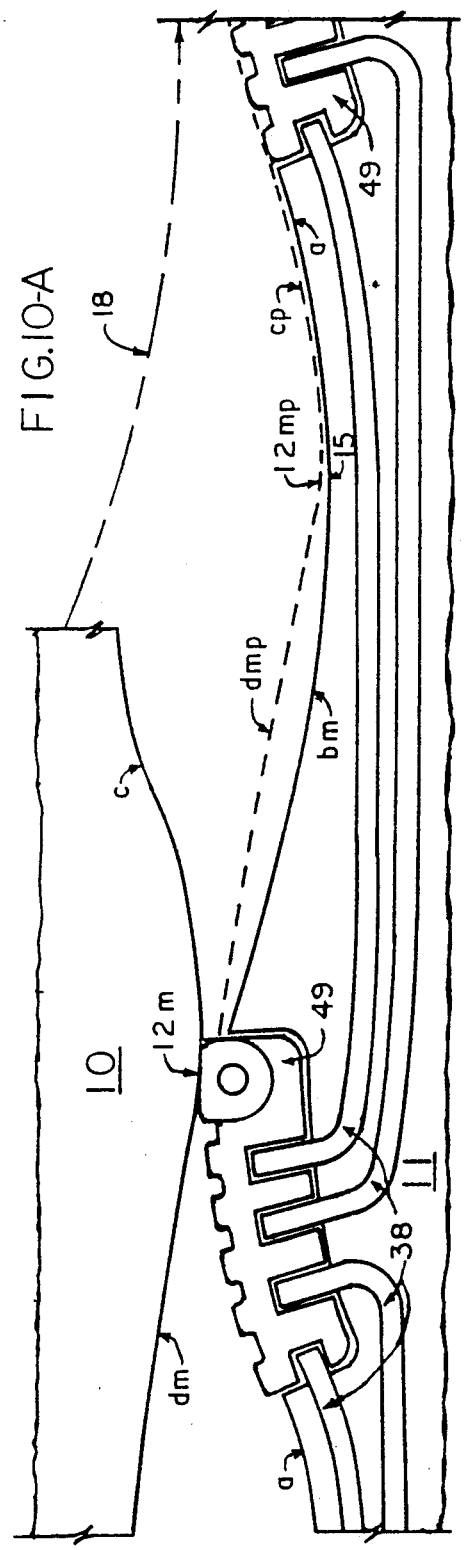

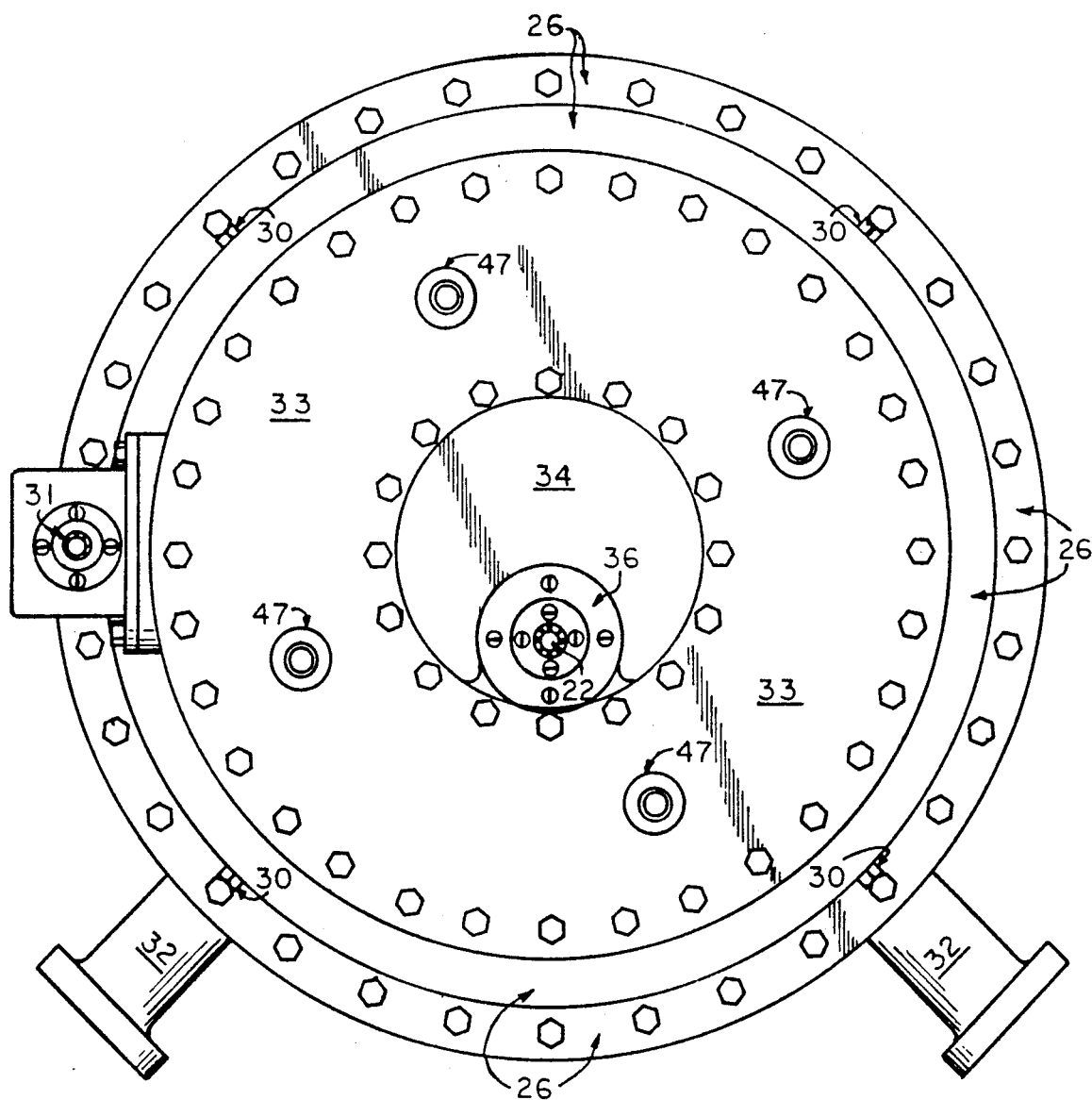

CIRCULAR ROTARY ENGINE

BACKGROUND OF THE INVENTION

1. Field of the Invention

This invention relates generally to rotary engines, and more particularly to a circular rotary engine with controlled rotary piston rotation and reciprocation for pressurization, compression and/or combustion applications, improved sealing of rotor and related inlet and outlet porting, directional chamber closure, functional internal and external gear drive applications, and control of circular rotary piston movement by a rotary flywheel guide.

2. Brief Description of the Prior Art

Circular rotary engines and pumps are known in the art, and there are several patents which utilize a circular rotating and undulating contoured rotor piston of some form. However, these patents differ from the present invention in structure and functional characteristics for compression/combustion, pressure fluid movement or various combinations thereof.

German Patent 274,940 utilizes a guided rotary piston with wave shaped frontal areas. The structural form of the rotary piston frontal contours and the stationary cylinder frontal areas are defined as waves that are shaped symmetrically with slanted side areas between the rotary piston waves and like slanted areas between the stationary cylinder waves. As described with reference to FIGS. 1 and 2, the rotary piston and cylinder frontal areas are symmetrical in shape. Therefore, when one side of the rotary piston wave shaped areas are seated in its contrary symmetrically shaped cylinder frontal indentation, there exists a total volume displacement on one side of the rotary piston and recipient cylinder end. This places the opposite rotary piston side and cylinder end in the full open volume position, with the symmetrical wave shaped frontal areas of the piston and cylinder being center aligned. With this configured position, the piston rotor is locked in place, if facial surface of the frontal areas are to maintain seal contact of the chambers for compression, combustion, and/or pressurization.

Boyd U.S. Pat. No. 3,667,876 relates the chamber configuration and size to the rotor movement and teaches that the movement of the rotary piston frontal wave around the cylinder frontal wave will create an opposed indented chamber with an elongated cam curve, not symmetrical, which creates a larger indentation shape than the frontal wave areas on both the piston and cylinder ends. However, Boyd does not provide for compression of fluids or gases to one chamber end with closure on the other end, to allow controlled pressure variances in the case of fluids, nor compartmental chamber compression control for gaseous combustion to provide directional rotor thrust.

The present invention seeks to resolve these problems and is distinguished over the prior art in general, and these patents in particular by a circular rotary engine having a housing with spaced concentric cylindrical walls defining an annulus therebetween with intake and exhaust ports through the sides of the walls and a cylindrical rotary piston ring having multiple symmetrically undulating frontal surfaces on both ends and coaxial interior and exterior gears for shaft drive which rotates within the annulus while reciprocating between end ring members positioned within the annulus and secured at each end of the interior and exterior walls. The end rings have opposite facing undulating frontal surfaces symmetrical with the undulating frontal surface of the rotary piston such that the piston ring frontal surfaces cooperate with the end ring frontal surfaces to alternately create a volume area and displace the volume area in some portion during rotation, thus alternately opening a series of chambers on one end of the rotary piston while displacing chambers on the opposite end with the oscillating movement during axial rotation of the rotary piston responding in motion against the symmetric frontal surfaces of the end rings. This motion is accomplished while maintaining frontal surface contact at all times, without restriction to rotation whereby frontal surface seal contact is maintained during axial reciprocating and rotary movement. All components are coaxial thus providing the rotary piston with controlled circular axial rotation within the annulus with the end ring members controlling reciprocation.

SUMMARY OF THE INVENTION

It is therefore an object of the present invention to provide an improved rotary principle having an effective application in all general areas of power generation and/or various conversions of power sources to drive mechanisms as utilized by the industrial and scientific community.

It is another object of this invention to provide a circular rotary engine having an improved method of rotary volume intake and displacement which can be utilized as a power source and/or converted to a variety of drive mechanisms.

Another object of this invention is to provide a circular rotary engine suitable for use with combustible fuels to drive a rotor with power conversion through internal or external gear driven shafts.

Another object of this invention is to provide a circular rotary engine suitable for use with steam or high pressure fluid injection to drive a rotor with power conversion through internal or external gear driven shafts.

Another object of this invention is to provide a circular rotary engine suitable for use with combined fuel combustion and alternate water injection for self-steam generating pressures with power conversion through internal or external gear driven shafts.

A further object of this invention is to provide a circular rotary engine suitable for use with exotic fuels that are compressible, expandable and/or self igniting when mixed, that generate pressure for thrust power to drive a rotor with power conversion through internal or external gear driven shafts.

A still further object of this invention is to provide a circular rotary engine which may be driven by an outside power source coupled through internal or external gear driven shafts to axially rotate a rotor to operate as a compressor or pump.

Other objects of the invention will become apparent from time to time throughout the specification and claims as hereinafter related.

The above noted objects and other objects of the invention are accomplished by a rotary engine comprising a housing having concentric interior and exterior walls with intake and exhaust ports in the walls and a cylindrical rotary piston having multiple symmetrically undulating frontal surfaces on both ends which is axially rotatable within the annulus between the walls while oscillating between end rings at opposite ends of the walls which have opposed symmetrically undulating frontal surfaces wherein frontal surface seal contact is maintained during axial rotating and oscillating piston movement. All components are coaxial providing the piston with controlled circular axial rotation within the annulus, with the end rings controlling the reciprocating oscillation.

The opposed annular facial surfaces of the cylindrical rotary piston and end rings are contoured symmetrically to allow transitional movement of the rotary piston between the end rings whereby the movement alternately opens a series of chambers on one end of the rotary piston while displacing chambers on the opposite end with the oscillating movement during axial rotation of the rotary piston responding in motion against the symmetric frontal surfaces of the opposed end rings.

The axial rotation with oscillating movement of the piston, with related intake and exhaust ports in the walls, provides the cyclical functions for gaseous intake, compression, combustion and exhaust as in a four stroke engine cycle. The cyclical functions of an engine are attained with a minimum of two configured sections of undulating frontal surfaces on both annular end surfaces of the piston and the end ring members all being symmetric in form and shape. The cyclical functions may be increased by adding multiples of two configured sections, one intake/exhaust, one compression/combustion, to the piston and the end rings, restricted only by desired circumferential motor size and chamber size to achieve power output requirements.

In the preferred engine there are four symmetrically configured sections on each annular end surface of the rotary piston and the end rings. Two of the configured sections on each rotary piston end surface function as exhaust and intake pistons while the two other configured alternating sections on each rotary piston end function as compression and combustion pistons with each configured section alternately following in functional sequence. The rotary piston, responding in concerted motion with the symmetrically configured four sections of the end rings will then perform each functional operation (8) eight times on each end of the rotary piston with (8) eight reciprocating functions on the opposite end of the piston resulting in (16) sixteen functional operations of intake, compression, combustion, and exhaust being achieved during one cyclical rotation of the rotary piston.

A rotary engine in accordance with the present invention, with related inlet and outlet ports, will function as a pressurized rotary motor, with pressure injection of fluids, i.e. gases, steam or elements creating pressure, into the displaced chambers on one end of the rotary piston. Thereby causing directional rotation with opposed chamber displacement wherein pressured injection is alternately repeated for continuous rotary movement.

Other applications of the present invention are in the field of compressors and pumps. A power source providing internal or external axial rotation of the rotary piston, with related inlet and outlet ports, will intake, compress, and displace gaseous elements or provide pressurized fluid movement. The present rotary engine, with related inlet and outlet ports, allows combinations of these described functions. The symmetrically configured surface sections on the rotary piston and end rings may be alternated or combined in functions of combustion, pressure injection, compression of gaseous elements, or pressure movement of fluids.

BRIEF DESCRIPTION OF THE DRAWINGS

FIG. 1 is a perspective view of a cylindrical rotary piston between stationary end ring components for defining the rotor movement and its physical structure.

FIG. 1A is a horizontal plane diagram of a cylindrical rotary piston between stationary end ring components for defining the rotor movement and its physical structure.

FIG. 1B is a front end view of the cylindrical rotary piston ring within the annular space of interior and exterior cylindrical walls.

FIG. 2 is a perspective view of a cylindrical rotary piston between stationary end components depicting a modified physical structure for controlled compression and directional thrust.

FIG. 2A is a horizontal plane diagram of a cylindrical rotary piston between stationary end components depicting a modified physical structure for controlled compression and directional thrust.

FIG. 2B is a perspective view of the center axis gradient projection of the facial surface configuration for the cylindrical rotary piston and the stationary end ring facial surfaces which may be perpendicular to the center axis, or angular to provide a wider facial surface with increased chamber volume within the same perpendicular chamber depth.

FIG. 3 is a partial horizontal plane diagram of the cylindrical rotary piston within two chambers between the symmetrical end rings that are within the annular space between internal and external cylindrical housing walls, depicting the rotor in a closed chamber position on one end while open on the opposing end.

FIG. 3A is a partial horizontal plane diagram that depicts the rotor motion and position half way through two of the chambers.

FIG. 3B is a partial horizontal plane diagram that depicts the rotor movement to the full closed position on the opposing sides of two of the chambers.

FIG. 7A is a side elevation diagram depicting multiple cylindrical rotary pistons between outer end rings coupled as multiple rotary piston assemblies with separating alignment components.

FIG. 7B is a side elevation diagram depicting a synchronized counter rotation, or synchronized same directional rotating of a divided cylindrical rotary piston between outer end rings.

FIG. 8A is a horizontal plane diagram showing the internal cylindrical surface of the inner housing with porting and seal configuration.

FIG. 9A is a horizontal plane diagram showing the internal rotary piston surface porting and the end member seal configuration.

FIG. 10 is a horizontal plane diagram showing chamber configuration for compression ratio changes.

FIG. 10A is a horizontal plane diagram showing facial surface sealing and chamber configuration modified for compression ratio change.

FIG. 11 is an exterior frontal elevation view of the engine.

DESCRIPTION OF THE PREFERRED EMBODIMENT

Figure 4:
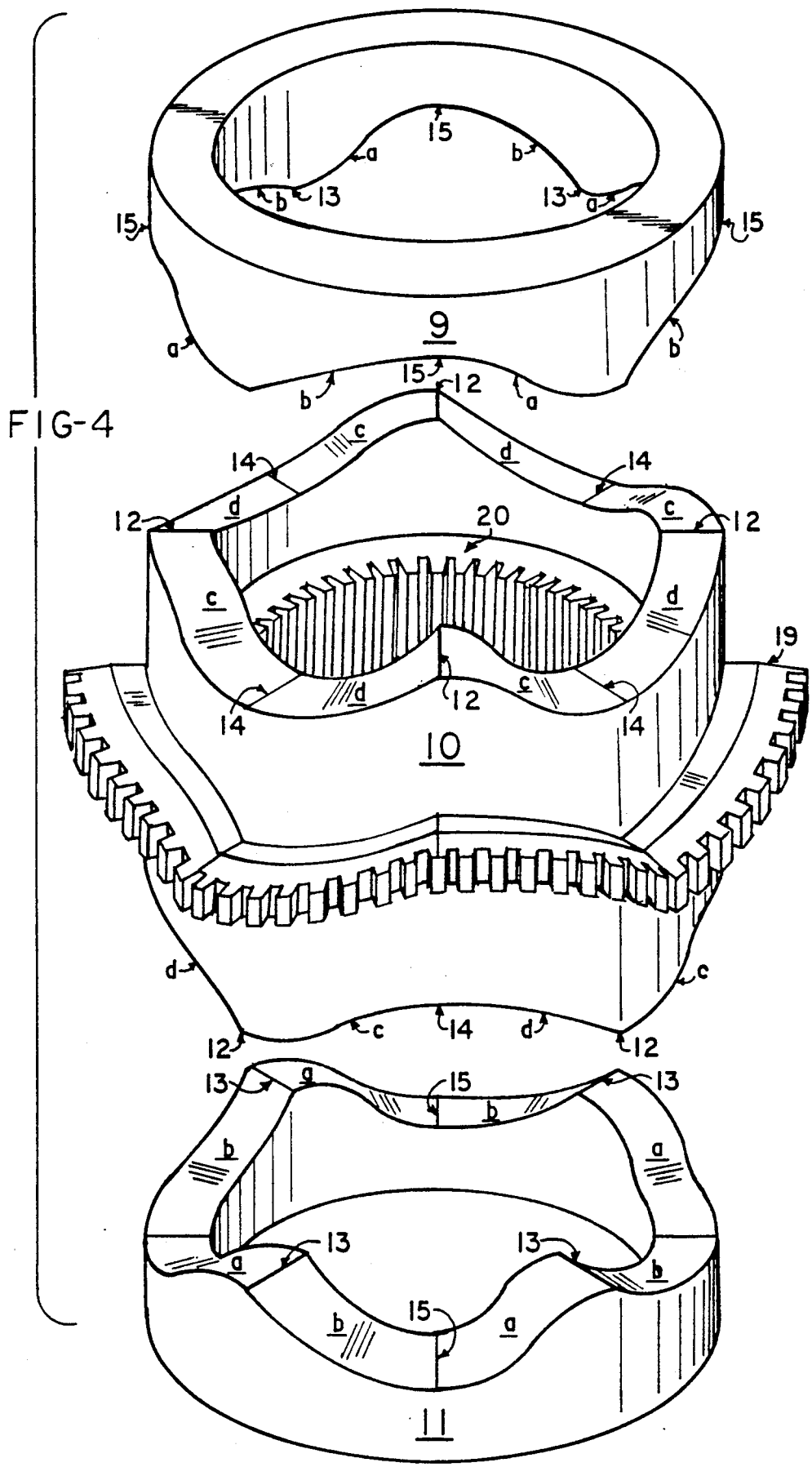
FIG. 4 is a perspective view of the cylindrical rotary piston, with rotary guide flywheel, external gear and internal gear drives, with the stationary end rings separated but in alignment.

Referring to the drawings by numerals of reference, there is shown in FIG. 1 a perspective view of a preferred cylindrical rotary piston ring and end ring assembly comprising three coaxial components 9, 10, and 11. Components 9 and 11 being the outer annular end rings and 10 being the center annular rotor or rotary piston component. Components 9, 10, and 11 are carried within an annular space between coaxial cylindrical interior wall 23 and exterior wall 26 of a housing, as shown in FIG. 1B and described hereinafter.

FIG. 1A is a projection of the peripheral surface of the components of FIG. 1 to a horizontal plane showing the configured surface pattern as series of equal angular straight lines perpendicular to and gradiently projected from the axial center line of FIG. 1 with determined dimensional widths and equal depth to components 9, 10, and 11. Chamber 1 is defined by the dimensional and angular change between the outer and inner surface extremities of cylinder components 9, 10, and 11 creating equal, symmetric, recessed facial surfaces "a" and "b", "c" and "d" on each component. The angular lines of points 13 and 15 on outer components 9 and 11 are equal in degrees and length to the angular lines of points 12 and 14 on cylindrical rotary piston 10 and equally and symmetrically change gradiently with varying radial dimensional projection from the axial center line. In FIGS. 1 and 1A, the cylindrical rotor 10 is in a closed position in chamber areas 5, 6, 7 and 8 with the opposing chambers 1, 2, 3 and 4 in an open position. Chamber 3 is on the back side of the rotor and is not visible in FIGS. 1 and 1A. The movement of rotor 10 in the direction of arrow 18 (FIGS. 3A and 3B) will then open chambers 5, 6, 7, and 8 while closing the opposing chambers 1, 2, 3, and 4, thereby providing volumetric expansion and displacement cycles.

FIG. 1B shows the cylindrical rotary piston 10 within the annulus between interior cylindrical wall 23 and exterior cylindrical wall 26. The end facial surfaces of the abutting cylindrical components are divided into four equal quadrants. Radial quadrant lines 12 and quadrant center lines 14, are shown with recessed surface areas "c" and "d" located on the end facial surface of rotary piston 10. A symmetrical configuration is thus provided allowing the cylindrical rotor or piston component 10 to axially rotate and reciprocate between the outer end ring components 9 and 11, alternately opening and closing a series of chambers, four on each end with symmetrical recessed facial surfaces "a" and "b", "c" and "d", while maintaining facial surface contact during movement.

The unique configuration and functional characteristics of the rotary engine are illustrated in FIGS. 2, 2A, and 2B. FIG. 2 is a perspective view of components 9, 10 and 11 having facial surfaces structurally configured in a manner to provide a pressurized and/or combustion chamber with directional thrust for rotor movement. As previously described, components 9, 10, and 11, in FIGS. 2, 2A and 2B, are divided into four equal quadrants to establish the symmetrical facial configuration of the abutting surfaces of components 9, 10, and 11. The projected quadrant lines 13 on the outer annular end rings 9 and 11 are in axial alignment, with 15 being the center line of each quadrant. Cylindrical rotary piston 10 has quadrant lines 12 on each end but alternately aligned with the quadrant center lines 14 on the opposite end, forming alternate configured positions on opposing ends.

FIGS. 2 and 2A illustrate the alignment of the outer end rings 9 and 11 along quadrant lines 13 and quadrant center lines 15 with facial surface areas "a" and "c" opposite facial surfaces "b" and "d" of rotary piston 10, with outer end rings 9 and 11 being spaced apart the width of rotary piston 10 and seal tolerances. Rotary piston 10 is shown between the outer end rings 9 and 11 with quadrant lines 12 on one rotary piston face aligned with quadrant lines 13 on outer end ring 11 forming open chambers 1, 2, 3, 4 in the complete cylinder circumference. Chamber 3 is on the back side of the rotor and is not visible in FIGS. 2 and 2A. The quadrant lines 12 of the opposing face of rotary piston 10 are aligned with the quadrant center lines 15 on outer end ring 9 forming compression or displacement areas within chambers 5, 6, 7, 8 in the complete cylindrical circumference with rotary piston 10 in the closed position. Chamber 7 is on the back side of the rotor and is not visible in FIGS. 2A.

The facial surface configurations for components 9, 10, and 11 between their respective quadrant lines 12 and 13 as shown in FIG. 2B are projected either perpendicular or angular from the axial center line. Quadrant center lines 14 and 15 being of a determined dimension perpendicular to the plane surface of lines 12 and 13 establishes the recessed depth of facial surfaces "a" and "b", and "c" and "d". Facial surfaces "a" and "c" are symmetric reverse curves between quadrant lines 12 and 13 and their respective quadrant center lines 14 and 15 are tangent to the plane surfaces of 12 and 13, and 14 and 15. Surfaces "b" and "d" are the resulting cam curves of surfaces "c" on rotary piston 10 moving across the abutting symmetrical surfaces of "a" on outer end rings 9 and 11, with quadrant lines 12 creating the cam curves "b" on outer end rings 9 and 11, while quadrant lines 13 create the cam curves "d" on rotary piston 10, as shown on FIG. 2A. Each quadrant surface, between quadrant lines 13 on the outer end rings 9 and 11, and between quadrant lines 12 on cylindrical rotor 10, is symmetrically formed in this manner establishing this reverse curve/companion cam curve principle.

FIGS. 3, 3A, and 3B further illustrate the movement of cylindrical rotary piston 10 between the outer end rings 9 and 11. As seen in FIG. 3, point 16 represents the center of rotary piston 10 and points 17 are the common center points between the axially aligned quadrant lines 13 of outer end rings 9 and 11 and center with the center points 16 of rotary piston 10 between its axial quadrant lines 12 and opposing end axial quadrant centerline 14 while in alignment with outer end ring quadrant lines 13. Line 18 represents the directional movement of rotary piston center points 16 as scribed through center points 17 between quadrant lines 13 of outer end rings 9 and 11. In the position shown in FIG. 3, cylindrical rotary piston 10 is in the closed position in chambers 5, 6, 7, and 8 against outer end ring 9, and in the open position in chambers 1, 2, 3, and 4 on the outer end ring 11 end. In FIG. 3, chambers 1, 2, 3, and 4 are in the open position when the peaks (axial quadrant lines 13) of outer end ring 11 are axially aligned with abutting peaks (axial quadrant lines 12) of rotary piston 10 and their recessed axial quadrant center lines 14 and 15 are aligned.

In chambers 1, 2, 3, and 4 the symmetrical reversed curve facial areas "a" and "c" and the motion related cam curves "b" and "d" respectively are diagonally opposed in this axially aligned position. On the opposing end, chambers 5, 6, 7 and 8 are in the closed position when the peaks (axial quadrant lines 13) of outer end ring 9 are axially aligned with abutting recessed axial quadrant center lines 14 of cylindrical rotary piston 10 and rotary piston peaks on axial quadrant lines 12 are axially aligned with the recessed axial quadrant centerlines 15 of outer end ring 9. In chambers 5, 6, 7, and 8 the symmetrical reversed curve surface areas "a" and "c" are facially seated against each other with the motion related cam curves "b" and "d" perpendicularly opposed to each other, creating a compression area and residual displacement area from alternating rotary piston 10 functions.

The directional movement of the cylindrical rotor to the mid-point of the chambers is illustrated in FIG. 3A. In chambers 1, 2, 3, and 4, the peaks (axial quadrant lines 12) of rotary piston 10 have moved from alignment with the peaks (quadrant lines 13) of outer end ring 11 towards the recessed axial quadrant center lines 15 of ring 11 following its cam curves "b", with the rotor cam curves "d" between quadrant lines 12 and quadrant center lines 14, crossing over the peaks (quadrant lines 13) of outer end ring 11. This directional movement of rotary piston 10 is represented by center points 16 moving along scribed path 18 from center points 17 and duplicates and parallels cam curves "d" of rotary piston 10 sliding over peaks (quadrant lines 13) of outer end ring 11 in the direction of line 18, as shown in FIGS. 3A and 3B. Chambers 1, 2, 3, and 4 are now partially compressed and displaced with alternate functions of peaks (quadrant lines 12) of rotary piston 10, in chambers 1 and 3 the rotary piston being compression peaks and in chambers 2 and 4 the rotary piston being ported for displacement of exhaust gases as in a four cycle engine.

When functioning as a compressor or fluid pump all rotary piston peaks would be ported for pressurized release of fluids or compressed vapors, whichever function is applied. Upon the opposing face of rotary piston 10 abutting with outer end ring 9, chambers 5, 6, 7, and 8 are mid-way opened with partial volume expansion from the movement of rotary piston 10, with the facial surfaces "c" sliding over the symmetrical facial surfaces "a" on outer end ring 9, in the motion of the opposing chamber end cam curved surfaces "b" on outer end ring 11. In FIG. 3A, chambers 5, 6, 7, and 8 are now midway opened with partial volume from pressure/combustion expansion of alternate rotary piston functions in chambers 5 and 7 with the rotary piston being ported for intake of gaseous vapors and chambers 6 and 8. The rotary piston 10, responding to combustion pressure thrust, rotates in the directional movement of line 18 as shown in FIGS. 3A and 3B. When functioning as a compressor or fluid pump all rotary piston peaks would be ported for intake of fluids or vapors for compression.

FIG. 3B shows the completed transitional movement of rotary piston 10 from the closed position with outer end ring 9, as shown is FIG. 3, to the closed position with the opposing outer end ring 11. Rotary piston 10 has now completed the alternate functions of compression and exhaust displacement in chambers 1, 2, 3 and 4 in the closed position abutting outer end ring 11. The opposing end chambers 5, 6, 7, and 8 have been fully expanded to the open position with alternate rotary piston functions of intaking gaseous vapors and responding to directional combustion pressure thrust. In FIG. 3B, the directional movement of rotary piston 10 as scribed through the common center points 17 between outer end rings 9 and is represented by motion line 18, which parallels rotor cam lines "d" when on the same circumference plane. Motion Line 18 is the continuous cam curve reversal motion of rotary piston 10 and is the axial center line projection for the rotor flywheel guide flange 19 as shown and described in FIGS. 4 and 9.

FIG. 4 is an exploded perspective view of outer end rings 9 and 11, as aligned with rotary piston 10, as shown in FIG. 3. A rotor flywheel guide flange 19 extends radially from the circumference of rotary piston 10 and is configured in the undulating reverse curve of movement line 18, as shown in FIG. 3B, and has outer gear teeth on its periphery for external drive and/or starter engagement. Rotor flywheel guide flange 19 will be defined in more detail hereinafter with reference to FIG. 9. The interior of the rotary piston 10 is provided with a toothed inner ring gear 20 for shaft drive, as further defined with reference to FIGS. 5 and 6.

Figure 5:
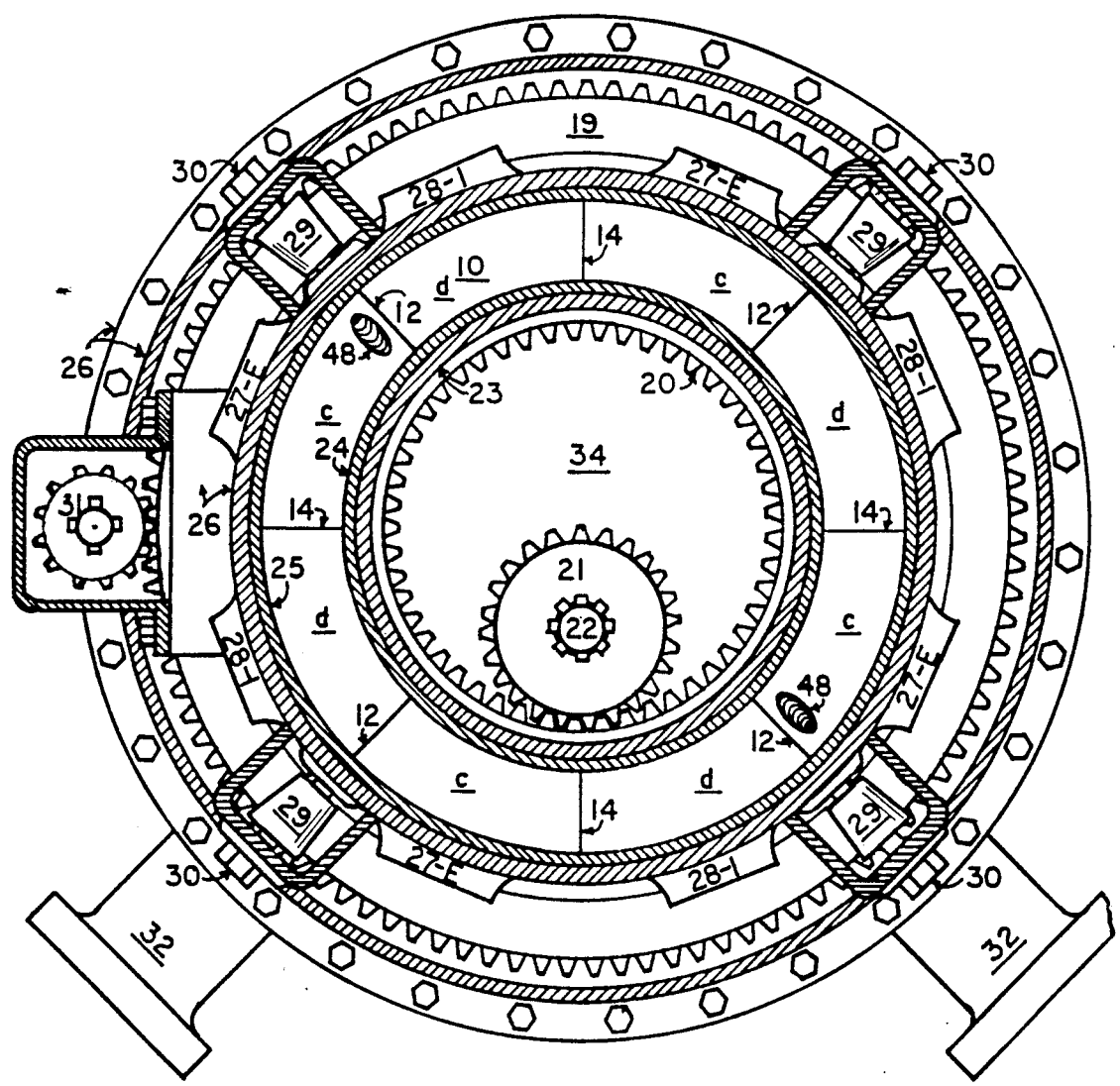
FIG. 5 is a frontal elevation cross-section of the machine showing internal and external gear drive applications, external and internal cylindrical housings, and other functional engine components.

FIG. 5 is a cross section through the front of the circular rotary engine illustrating the functional components of the engine. Shown from a frontal view is one end of rotary piston 10 with its symmetrical reverse curve facial surfaces "c" and related symmetrical cam curve surfaces "d". Quadrant lines 12 peaks are shown in alignment with the common transversing center points 17 between quadrant lines 13 of outer end rings 9 and 11 as shown in FIG. 3. The outer end rings 9 and 11 are affixed a distance apart within the annular space between coaxial interior wall 23 and exterior wall 26 of the housing to allow rotary piston 10 to move therebetween while axially rotating within the annulus as shown and described with reference to FIGS. 3, 3A, and 3B.

Figure 6:
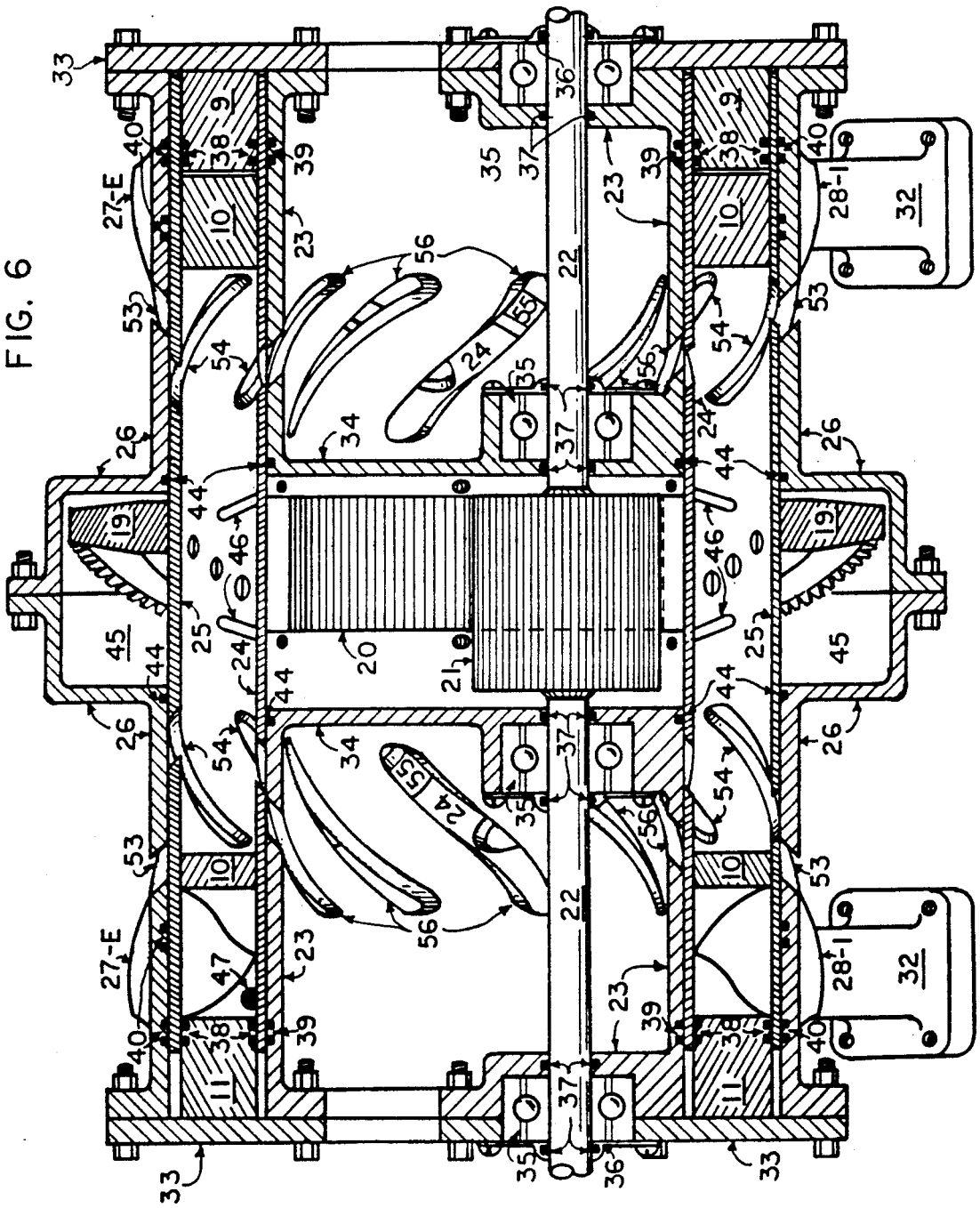
FIG. 6 is a side elevation cross-section of the motor showing the rotation guide fly wheel with external gear drive, internal gear drive, and other functional motor components including chamber seals.

As seen in FIGS. 5 and 6, rotary piston 10 has concentric inner 24, and outer 25 labyrinth ring sleeves extending longitudinally from its opposite end surface a distance to provide chamber sealing. The inner ring gear 20 is affixed to the interior diameter of rotor 10, as shown in FIG. 4 and is engaged with drive gear 21 to rotate shaft 22. Exhaust ports 27-E and intake ports 28-I are shown in their respective locations on exterior housing wall 26. Rotor guide control bearings 29 are located on both sides of rotor flywheel guide flange 19, and are aligned circumferentially with the common center points 17 between quadrant lines 13 of the outer end rings 9 and 11, as shown in FIGS. 3, 3A, and 3B, and retained in position by bolts 30 in exterior housing wall 26. The peripheral gear on rotor flywheel guide flange 19 engages outer gear 31 (FIG. 5) for external drive purposes or engagement of starter gear. Conventional engine mounts 32 are diagonally aligned with lower cylindrical rotor quadrant lines 12, as aligned with the center points 17 between the quadrant lines 13 of outer end rings 9 and 11.

As shown in FIG. 6, rotary piston 10 is in the closed position with outer end ring 9, and in the open position with outer end ring 11 as shown in FIG. 3. Outer end rings 9 and 11 are affixed to exterior housing wall 26, interior housing wall 23 and end plates 33 and with their respective peaks (quadrant lines 13) aligned within the annulus between walls 23 and 26, and spaced a distance apart to allow cylindrical rotor 10 to move between outer end rings 9 and 11, as shown in FIGS. 3, 3A, and 3B, while axially rotating within the annulus between housing walls 23 and 26. The opposite ends of inner and outer labyrinth ring sleeves 24 and 25 are slidably received on the inner and outer diameters of outer end rings 9 and 11 and maintain continuous contact with chamber seals 38 set in outer end rings 9 and 11, inner seals 39 set in interior housing wall 23, and outer intake and exhaust seal assemblies 40 set in outer housing wall 26 as described hereinafter with reference to FIG. 8.

Circular rotor flywheel guide flange 19 is affixed to the outer circumference of rotary piston 10 and shown in cross-section in exterior housing wall 26, and ring gear 20 is affixed to the inner circumference of rotary piston 10. Internal ring gear 20 as engaged with drive gear 21 is offset towards outer end ring 9, with rotary piston 10 in a closed position with 9, and will "walk" horizontally across drive gear 21 towards outer end ring 11 during axial rotation of rotary piston 10 following the motion of line 18 as shown on FIG. 3B. In other words, as the piston 10 rotates and reciprocates, the point of engagement of the teeth of gear 20 with the teeth of gear 21 will move longitudinally in increasing and decreasing increments following the path of line 18. This same "gear walking" motion occurs with the rotor flywheel guide flange 19 gear when engaged with an external drive gear 31 as shown in FIG. 5. Rotor flywheel guide flange 19 as shown in FIG. 6 axially rotates in the directional movement of line 18 (FIGS. 3B and 3A) within compartment 45, formed by exterior housing walls 26. The lower portion of compartment 45 serves as an oil lubricant well, with flywheel rotor flange 19 circulating the oil lubricants within compartment 45 to provide oil lubricants between exterior housing wall 26 and rotary piston 10 surfaces and external seals 44.

Conduits 46 extend through rotary piston 10 to provide oil lubricant passage to the internal gears 20 and 21, and between interior housing wall 23 and rotary piston 10 surfaces and internal seals 44 contained between parallel spaced housing walls 34 extending transversely between interior housing wall 23.

As seen in FIG. 6, a transverse portion of housing wall 26 extends radially outward from the annulus between interior cylindrical wall 23 and the axial portion of housing wall 26 and the transverse wall 34 extends radially inward from the annulus to form the compartment 45. Thus, compartment 45 has an inner portion extending radially inward from the annulus and an outer portion extending radially outward from the annulus. The inner portion receives a ring gear and the outer portion receives a guide flange and serves as a lubrication compartment as explained herein.

Housing walls 34 have axially aligned bearing collars for seating bearings 35 on shaft 22 with interior and exterior bearing retainers 36 and seals 37. A shaft 22 extends axially from each end of gear 21 through parallel spaced housing walls 34 at each end of compartment 45 and at opposite ends of the housing.

Figure 8:
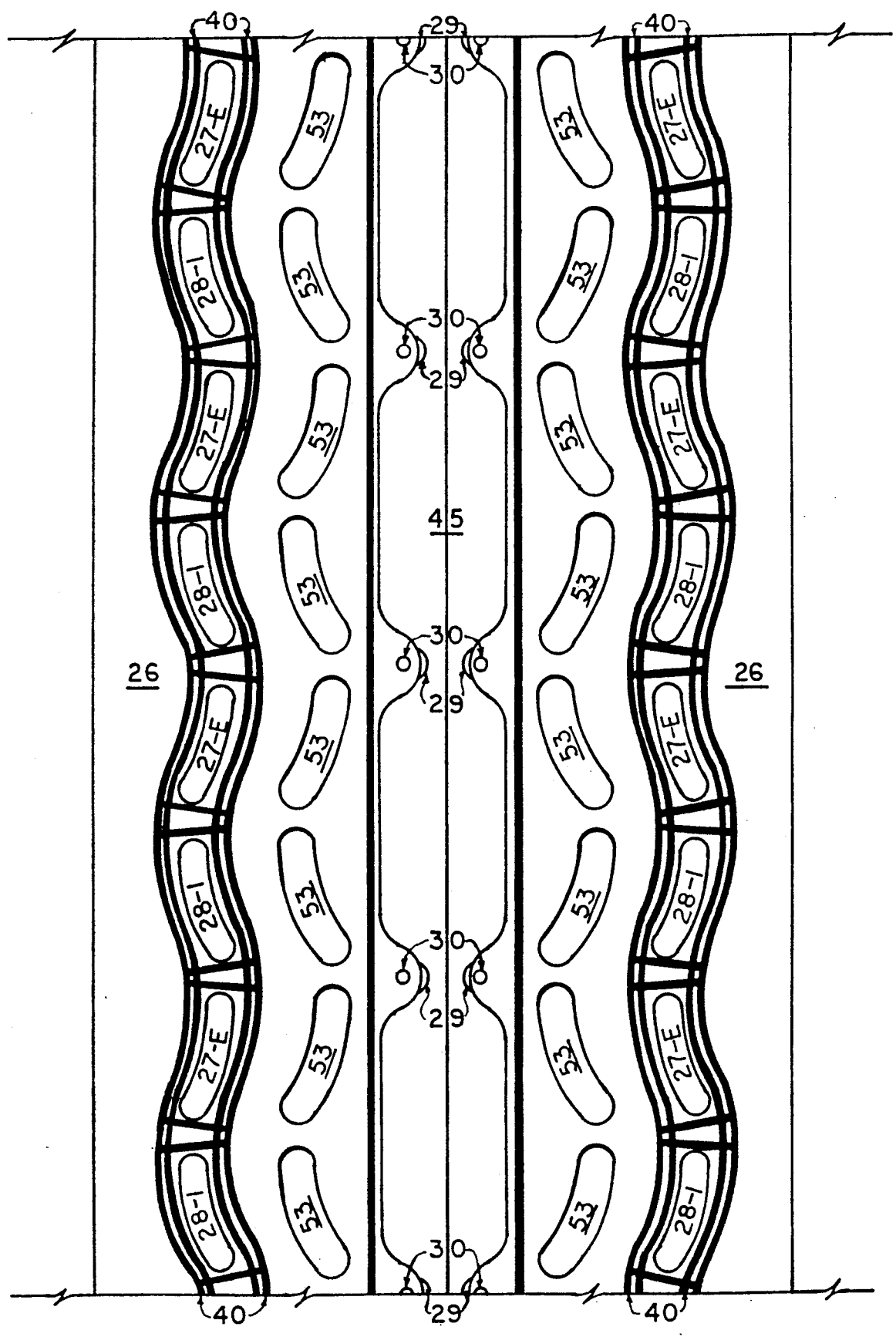
FIG. 8 is a horizontal plane diagram showing the internal cylindrical surface of the outer housing with porting and seal configuration.

Exhaust ports 27-E and intake ports 28-I in exterior housing wall 26 are shown in their respective positions for functioning with the passage of rotary piston ports 48 and separated by facial seal 49 on outer end rings 9 and 11 and by seal assembly 40 as shown in FIG. 8. External end housing plates 33 are bolted to interior and exterior housing walls 23 and 26 with outer end rings 9 and 11 affixed to plates 33 with their respective quadrant 13 lines in alignment (FIGS. 3, 3A and 3B). As aligned, housing plates 33 and their affixed outer end rings 9 and 11 have drilled and tapped spark plug holes 47 in each chamber as shown on FIGS. 6 and 11.

Figure 9:
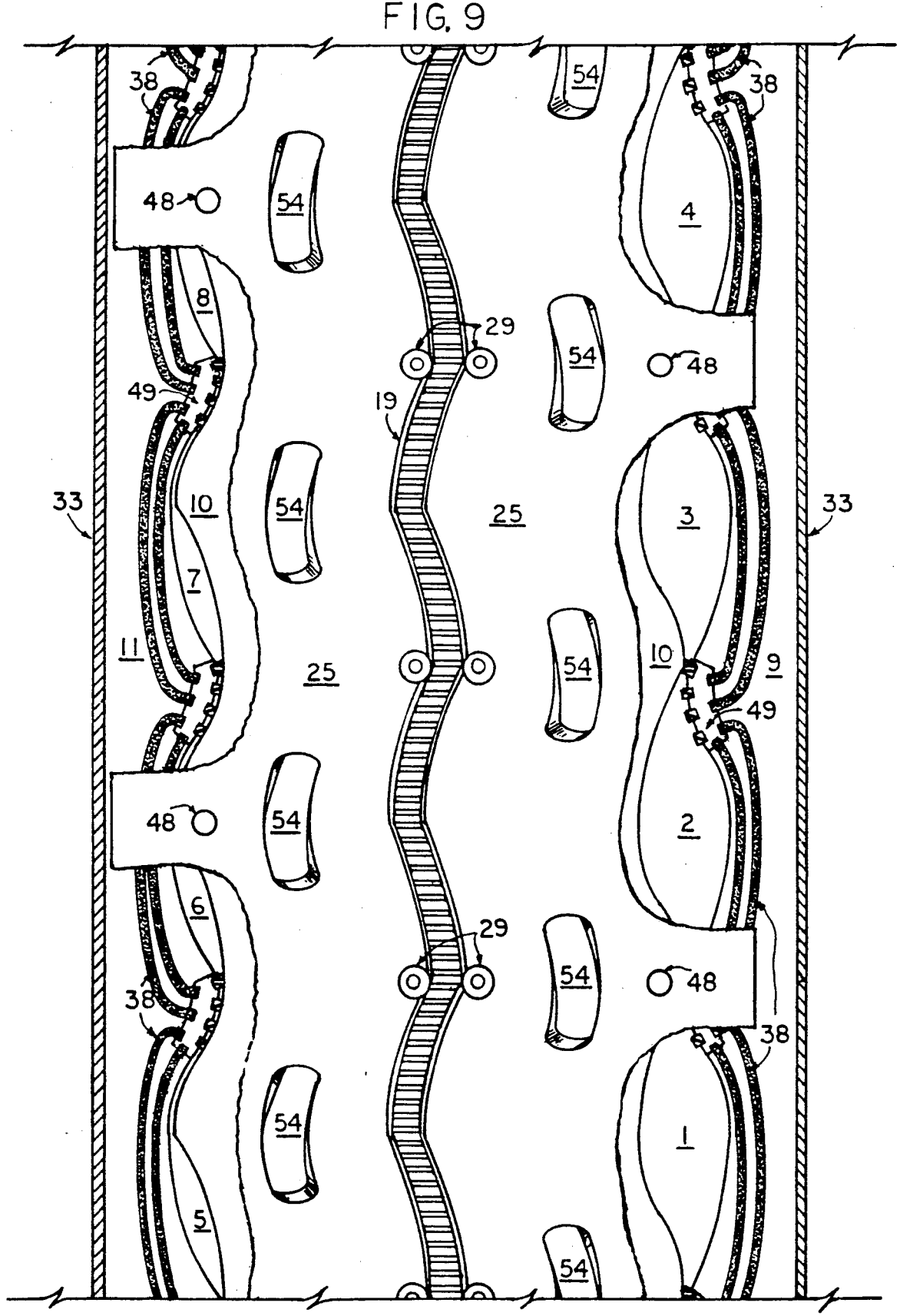
FIG. 9 is a horizontal plane diagram showing the thrust bearings and rotary guide fly wheel structural shape in relation to the cylindrical rotary piston movements, and the outer rotary piston surface porting and end member seal configuration.

Referring again to FIG. 6, cylindrical labyrinth ring sleeves 24 and 25 are integral axial extensions of rotary piston 10 as a functional component and create an internal void space between the opposing facial surfaces. The configured facial surfaces of rotary piston 10 have been split, and affixed within the integral labyrinth sleeves 24 and 25 as shown in FIG. 6, while aligned and functioning in total as cylindrical rotor 10 and as herein described. This spaced structure of rotary piston 10 then allows the application of internal air cooling circulation between the internal surface areas of rotor 10, during rotation of rotary piston 10 with alternating and opposing functions of intake, compression/combustion and exhaust cycles, through vent slots 53 and 56 in interior and exterior housing walls 23 and 26, as shown in FIGS. 6, 8, 8A and 12, with the passage of internal and external slots 54 and 55 in labyrinth ring sleeves 24 and 25 of rotary piston 10, as shown in FIGS. 9 and 9A, during functional rotation of rotor 10.

The external vent slots 54 when cut diagonally through the outer labyrinth ring sleeve 25 will intake cooling air through vent slots 53 in exterior housing wall 26, with like diagonally cut vent slots 55 through the inner labyrinth ring sleeve 24 expelling the cooling air through vent slots 56 in interior housing wall 23, thereby creating a continuous movement of cooling air through the internal void space in rotary piston 10, while providing a pressurized air cushioning between cylindrical inner and outer surfaces of rotary piston 10 and interior and exterior housing walls 23 and 26, on the surface areas between seals 44 and 39, and 40 respectively. The expelling of cooling air to the internal area of housing members 26 and 34, is then vented through the open portion of end housing plates 33 as shown in FIGS. 6 and 11 and can then be contained for direct manifold pressurization to intake ports 28-I. The perimeter areas of housing walls 23 and 26, and plates 33, that encompass the chamber areas between rotary piston 10, and outer end rings 9 and 11, can be air finned or jacketed to allow coolant fluid circulation, thereby providing additional cooling and controlled engine operating temperatures. This demonstrates the diverse capability of cooling for engines of this kind, which would vary with design application of variable cylindrical rotors, or combinations thereof, as may be applied in industry, such as submersible marine engines where coolant requirements may not be required.

The particular physical characteristics of the present circular rotary engine allows it to be constructed of ceramic composite materials such as alumina, silicon carbides, zirconia, or other specialty high temperature materials available in the industry to provide high temperature engine performance, increased fuel burning efficiencies, and reduced exhaust emissions. An engine utilizing such materials may not require the above described cooling alternatives.

The industrial utility applications of the improved circular rotary principles encompass many varied applications and are not limited to the particular applications described herein as examples.

Various applications utilizing different combinations of cylindrical rotary pistons and outer annular end rings are illustrated schematically and described with reference to FIGS. 7, 7A, and 7B.

Figure 7:
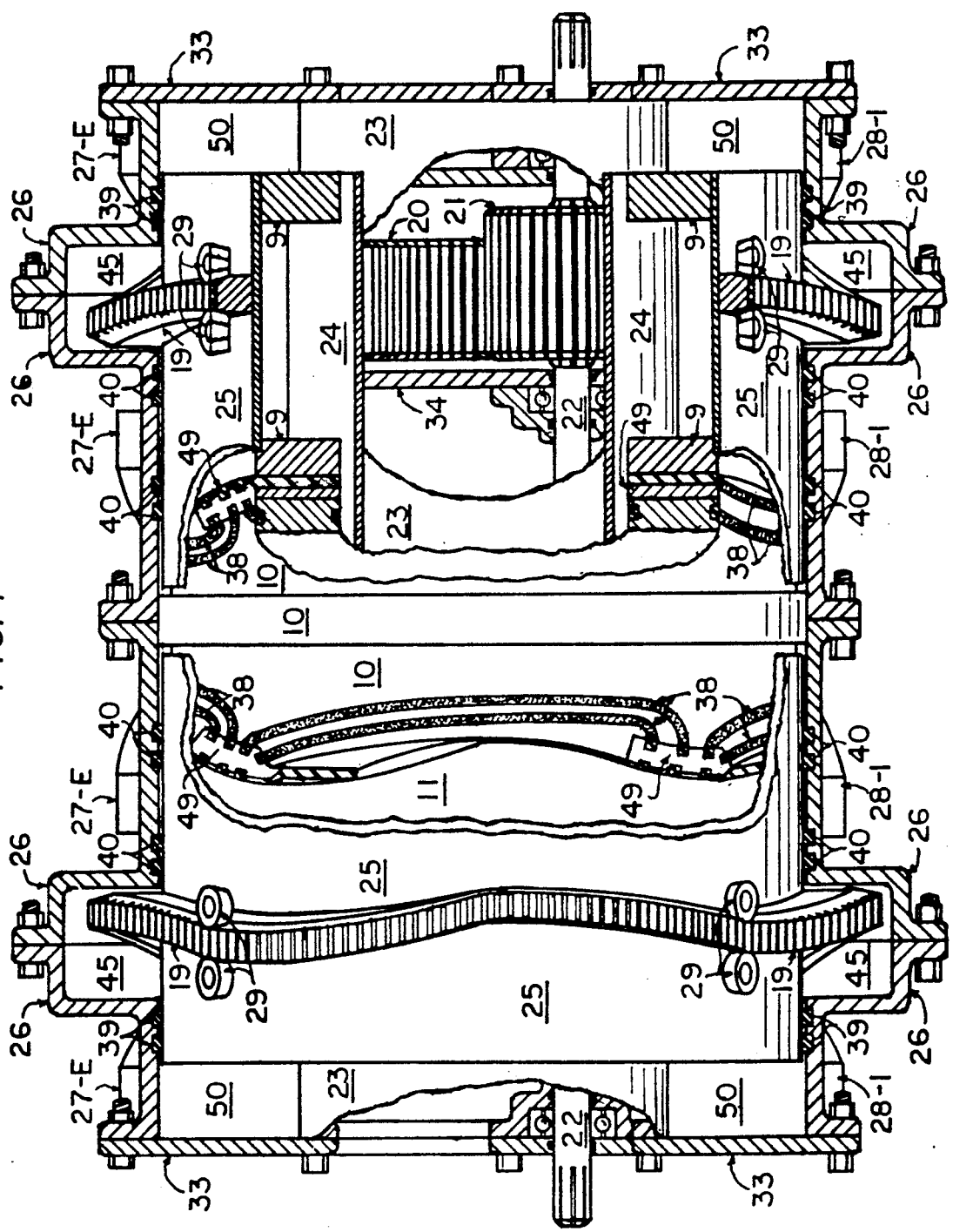
FIG. 7 is a side elevation diagram depicting synchronized counter rotation, or synchronized same directional rotating movement of the end rings with the cylindrical rotary piston being in a fixed position.

FIG. 7 depicts rotation of the outer end rings 9 and 11, with rotary piston 10 stationary, allowing compression combustion cycles to be opposed synchronized to suppress rotary reciprocation effects. Facial configurations can also be reversed on either end of the rotary piston or end rings to allow synchronized counter rotation of outer annular end rings 9 and 11. In this application, the rotating outer annular end rings, 9 and 11, would each have separate internal ring gears 20, drive gears 21, and flywheel guide flange controls 19, as shown in FIGS. 4, 5, and 6, with corresponding functional arrangements of seals, intake, and exhaust ports, and ignition systems. The annular chamber between outer end rings 9 and 11, flat surfaces 50, and the external housing plate 33 on FIG. 6, created by the axial rotation and reciprocation of rings 9 and 11, provides an intake or displacement function within the chambers on both outer annular extremities of rings 9 and 11 between their respective housings 33. This allows a variety of functional applications of; pressurized fuel vapor intake; centralized displacement of exhaust; or various compressor applications such as air conditioning, cooling fluid circulation, or ambient air cooling circulation, as similarly described below with reference to FIG. 7B applications.

FIG. 7A depicts multiple cylindrical rotary piston assemblies 10 with central alignment spacers 58 fixed between outer end plates 33. The assemblies are connected by coupling the splined shafts 22 with a splined sleeve 57. The rotary pistons have undulating surfaces on both ends, and are alternately mid-chamber aligned. This application allows opposed synchronized compression combustion cycles to suppress rotary reciprocation effects and illustrates the capability of increasing the number of rotors to achieve a required power output. In this application, each rotary piston assembly would have separate internal gears 20, drive gears 21 with a common shaft 22, and flywheel guide flange controls 19, as shown in FIGS. 4, 5, and 6, with corresponding functional arrangements of seals, intake and exhaust ports, and ignition systems.

FIG. 7B depicts rotary piston component 10 split into two cylindrical components 10A and 10B that can rotate the same direction or be made to counter rotate with chamber alignment mid point to each other, allowing opposed synchronized compression combustion cycles to suppress rotary reciprocation effects. Annular chamber 52 will intake and compress or displace with the cylindrical rotation of rotor components 10A and 10B. In this application each cylindrical rotor components would have separate internal gears 20, drive gears 21 with a common shaft, (unless rotating counter clockwise) and flywheel guide flange controls 19, as shown in FIGS. 4, 5, and 6, with corresponding functional arrangements of seals, intake and exhaust ports, and ignition systems. The annular chamber 52 created by the axial rotation and oscillation of cylindrical rotor components 10A and 10B acting in opposition of each other, providing intake and compression or displacement functions, allows a variety of functional applications of; pressurized fuel vapor intake; centralized displacement of exhaust; or various compressor applications such as air conditioning, cooling fluid circulation, or ambient air cooling circulation, as similarly described above with reference to FIG. 7.

The outer end ring seal system, intake and exhaust seal system, the oil seals and the rotor flywheel control system of the engine embodiment of FIGS. 4, 5, and 6 are illustrated on a horizontal plane in FIGS. 8, 8A, 9, and 9A.

The outer seal assembly 40, as shown in FIG. 8 is recessed in the interior surface of exterior housing wall 26 encompassing exhaust ports 27-E and intake ports 28-I which are cut through the exterior housing wall, and configured in the movement line of intake exhaust port 48 on rotary piston 10. Seal assembly 40 is comprised of outer circumferential compression rings with inside fluid seals adjacent to exhaust ports 27-E and intake ports 28-I with cross connecting seal portions between each exhaust and intake port, providing isolation of exhaust and intake functions with the passage of rotary piston port 48. Seal 44 is a circumferential oil seal recessed in exterior housing wall 26, providing separation of oil lubricants from compartment 45 during rotation of rotary piston 10 and rotor flywheel guide flange 19, as shown in FIG. 6. Air vent slots 53 are cut through exterior housing wall 26, between seals 40 and 44, providing intake of cooling air with the passage of air through vent slots 54 in outer labyrinth ring sleeve 25 of rotary piston 10, and as defined and shown in FIGS. 6, 8A, 9, and 9A.

FIG. 8A illustrates seal assembly 39 recessed in interior housing wall 23 as two parallel circumferential compression rings that are cross-connected to restrict circular movement, or to allow intake or exhaust porting, as defined with reference to FIG. 8. Seal 44 is a circumferential oil seal recessed in interior housing wall 23, providing separation of oil lubricants from the internal gear compartment between inner housing walls 34 as shown in FIG. 6. Air vent slots 56 are cut through interior housing wall 23, between seals 39 and 44, allowing circulation of cooling air with the passage of air vent slots 55 on inner labyrinth ring sleeve 24 of rotary piston 10 during rotation in concert with the external housing vents as defined and shown with reference to FIGS. 6, 8, and 8A.

The end ring seal assemblies 38, as shown in a horizontal plane in FIGS. 9 and 9A, are recessed on both inside and outside diameter surfaces of outer end rings 9 and 11 and comprises two compression rings, contoured in the undulating facial configuration of outer end rings 9 and 11, and interlocked with facial seals 49, as shown in FIG. 10A. Facial seals 49 are a series of vertical facial seals extending from the connecting tangent point of the facial reverse curves to the peaks (quadrant lines 13) on outer end rings 9 and 11. Vertical facial seals 49 are interlocked with circular ring seals 38, as shown in FIG. 10A, and in surface contact with labyrinth ring sleeves 24 and 25, as shown in FIGS. 6, 9, and 9A, providing chamber isolation of rotary piston 10 functions of exhaust, intake, through ports 48, with alternating compression, combustion functions. Spark plug holes 47 are shown in FIG. 11 in their respective locations through outer end housing plates 33 and end rings 9 and 11 into the compression area of each chamber. On rotary piston 10, ports 48 are shown alternately located on the reverse curve crest or peaks (quadrant lines 12). In passage of port 48 across exhaust port 27-E (FIG. 8) during a chamber closure stroke, as shown in FIG. 3A and 3B, combustion vapors are exhausted. With the following chamber opening stroke, port 48 passage across intake port 28-I (FIG. 8) will intake the vaporous fuel mixture for compression by the following non-ported quadrant peak 12 on rotary piston 10.

Air vent slots 54 are cut through outer labyrinth ring sleeve 25 of rotary piston 10 to provide intake of cooling air with the passage of air through vents slots 53 in exterior housing wall 26, and expel the cooling air through vent slots 55 cut through inner labyrinth sleeve 24 of rotary piston 10 and vent slots 56 of inner housing wall 23, as shown in FIGS. 6, 8, 8A, 9, and 9A.

FIG. 9 illustrates rotor flywheel guide flange 19 in a horizontal plane as fixed to the outer labyrinth sleeve 25 of rotary piston 10, configured in the reverse curve of motion line 18 of rotary piston 10, as scribed through the common center point 17, of outer end rings 9 and 11 on quadrant lines 13, as shown in FIGS. 3A and 3B, while positioned between bearings 29 aligned with center points 17 and located within compartment 45 and bolted to the outer perimeter of exterior housing wall 26, as shown in FIGS. 5, 6, and 9. The rotor flywheel guide flange 19 reverse curve configuration is the axial projection of center points 16 and motion line 18 of rotary piston 10, as shown in FIGS. 3, 3A, and 3B. Rotary control bearings 29, mounted on the external surface of exterior wall 26 and center aligned with common center points 17 with rotor flywheel guide flange 19 centered between bearings 29 and with facial contact on each side, will then control the movement of rotary piston 10, and allow clearance tolerance settings against the vertical annular facial seals 49 on outer end rings 9 and 11, as shown in FIG. 10, establishing the rotor flywheel guide flange control principle.

FIG. 9A further illustrates internal ring gear 20 in a horizontal plane as fixed to inner labyrinth sleeve 24 for engagement with drive gear 21 as shown in FIGS. 5, 6, and 8A.

The variation of compression ratio with reduction in the residual chamber volume at the completion of the closure compression or displacement stroke of rotary piston 10 is illustrated in FIGS. 10 and 10A. When quadrant line peak points 12 on rotary piston 10 and quadrant line peak points 13 on outer end rings 9 and 11 are cut in a rounded form "12m" and "13m", recessing the quadrant line peaks 12 and 13, the facial surface lines of "b" on outer rings 9 and 11 and "d" on rotor 10 can be modified, as shown by modified surface lines "bm" and "dm", and as projected by "dmp", "12mp" and "cp", providing a reduction of residual chamber volume at the completion of the closure compression or displacement stroke of rotary piston 10, as illustrated in FIG. 10A. With the pre-established configuration of rotary piston 10 and outer end rings 9 and 11, rotary piston 10 movement on line 18 remains constant as controlled by flywheel guide flange 19 moving between control bearings 29 located in line at common movement points 17 between outer end rings 9 and 11, as shown in FIG. 9. Facial seals 49, as shown in FIG. 10A, are spring urged against the facial surface of rotary piston 10 allowing the modification of facial surfaces "b" and "d" to "bm" and "dm" to vary compression ratios, while maintaining tolerance space seating of facial surfaces of "a" on outer end rings 9 and 11, with facial surfaces "c" on rotary piston 10, as controlled by rotor flywheel guide flange 19 and control bearings 29, as shown in FIG. 9.

As illustrated in FIGS. 10 and 10A, increased compression ratios allow use of diesel and other high compression fuels for industrial and commercial applications requiring specific design characteristics of cylindrical rotor combinations as defined and illustrated in FIGS. 7, 7A, and 7B, but not limited to such, and as functionally defined and illustrated in FIGS. 3, 3A, 3B; and generally defined in FIGS. 5 and 6 as an engine of a kind that has typical representative operational characteristics. Functional combinations of varied compression ratios is possible, and as illustrated in FIGS. 3, 3A, 3B wherein rotary piston 10 movement is described. Cross porting of exhaust from chambers 2 and 4 on one end of cylindrical rotor 10 across to chambers 5 and 7 on the opposed end during their intake stroke provides additional thrust from cross pressurized exhaust gases for second compression/combustion of exhaust gases. With chambers on one end being of low compression volume while opposing end chambers are high compression volume, cross porting of exhaust allows second combustion of exhaust gases, providing increased fuel efficiency and reducing carbon dioxide in exhaust, and allows improved filtration of exhaust toxics and particles with existing automotive environmental control systems.

Figure 12:
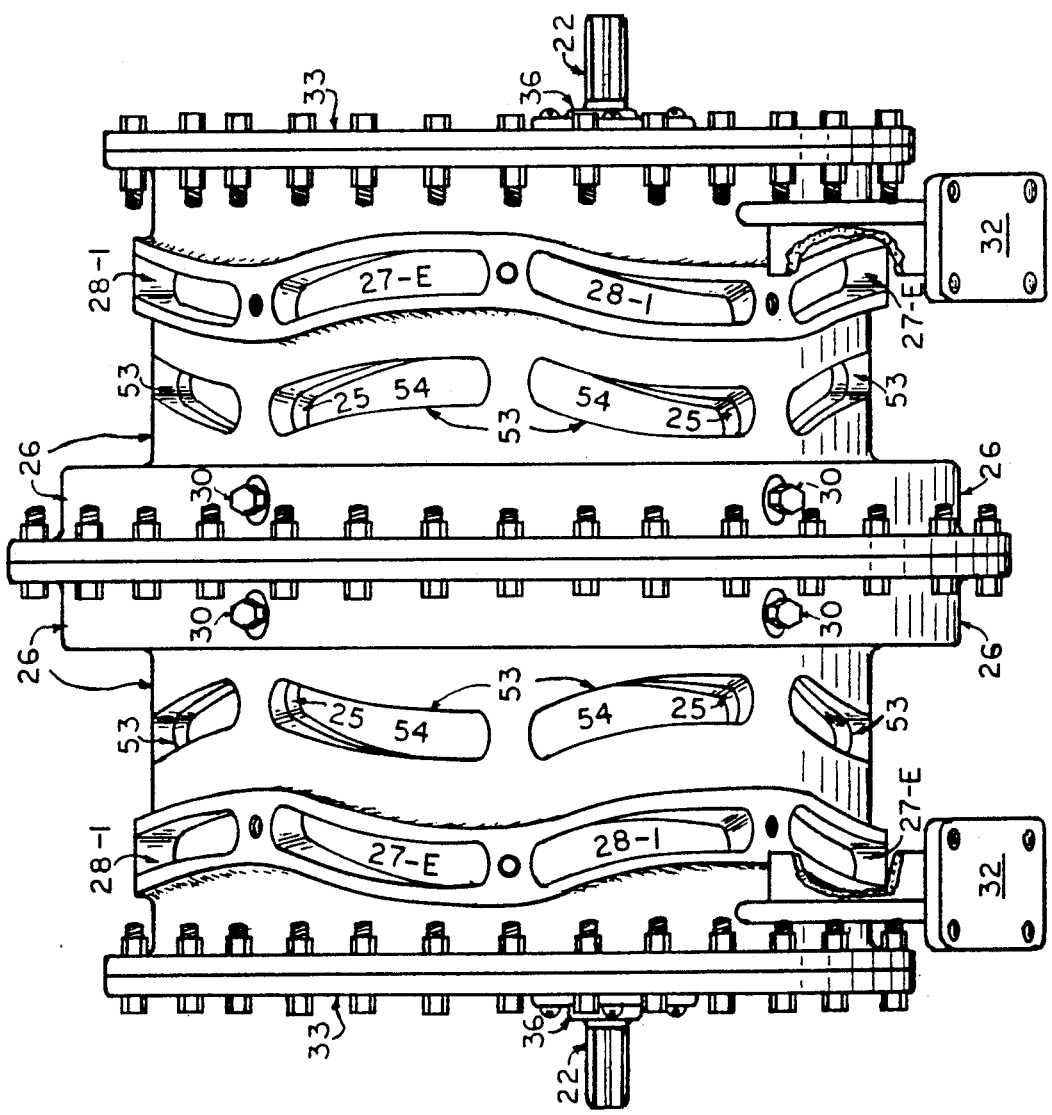
FIG. 12 is an exterior side elevation view of the engine.

The exterior end of the engine embodiment of FIG. 6 is shown in FIG. 11. As shown in FIG. 11, drive shaft 22 is located off-center with an internal drive gear 21, as shown in FIG. 5. End housing plates 33 are bolted to interior and exterior housing walls 23 and 26 with outer end rings 9 and 11 affixed in their aligned positions as shown in FIGS. 5, 6 and 12, and encase shaft bearings 35 as shown in FIG. 6, with outer bearing covers 36, and spark plug recessed threaded openings 47. Exhaust ports 27-E and intake ports 28-I are shown in FIG. 12 in their respective locations for internal annular rotary piston 10 rotational functions of intake, compression/-combustion, and exhaust cycles. Typical engine mounts 32 are positioned at an angular location on housing wall 26 as also shown in FIGS. 5, 6, and 12. External gear drive assembly 31 is shown connected to exterior housing wall 26, to engage perimeter drive gear on rotor flywheel guide flange 19, or provide starter motor gear engagement with rotor flywheel guide flange 19 perimeter gear, as shown in FIG. 5. The radial external compartment 45 is an integral part of exterior housing wall 26 that encases rotor flywheel guide flange 19 and rotor guide control bearings 29, as shown in FIGS. 5, 6, 11, and 12. Exterior housing wall 26, end housing members 33, chamber walls 34 and interior housing wall 23 may either be water cooled or air fin cooled, or combinations thereof depending on design requirements of engine application.

The particular physical characteristics of the present circular rotary engine allows it to be constructed of various ceramic composite materials such as alumina, silicon carbides, zirconia, or other specialty high temperature materials available in the industry to provide high temperature engine performance, increased fuel burning efficiencies, and reduced exhaust emissions. The cooling alternatives described above may not be required or desirable in an engine utilizing such high temperature specialty materials.

The exterior side of the engine of FIGS. 5, 6, and 11 is shown in FIG. 12. The exterior housing walls 26 are bolted together at the center location encasing rotor flywheel guide flange 19 and rotor control bearings 29 as shown in FIGS. 5 and 6, and bolted to external end housing plates 33 on opposite ends. Exhaust ports 27-E and intake ports 28-I are shown in their respective locations for internal annular rotary piston 10 rotational functions of intake, compression/combustion, and exhaust cycles. Typical engine mounts 32 are shown on one side of exterior housing wall 26 in alignment front and back, and as shown in FIG. 11, at an angular location to each other, with four engine mounts in total. Spark plug recessed threaded openings 47 are shown in their respective locations in end housing plates 33, as shown in FIG. 11. Drive shaft 22 is located off-center as shown in FIGS. 5, 6, and 11. Exterior air vent slots 53 located in exterior housing wall 26, as shown in FIG. 8, with air vent slots 56 in interior housing wall 23, as shown in FIG. 8A, provide internal air cooling, while end housing members 33 and the portions of exterior housing 23 encompassing combustion areas as shown in FIG. 6 may either be water cooled or air fin cooled, or combinations thereof, depending on design requirements of engine application.

As previously mentioned, the circular rotary engine may be constructed of various ceramic composite materials such as alumina, silicon carbides, zirconia, or other specialty high temperature materials available in the industry to provide high temperature engine performance, increased fuel burning efficiencies, and reduced exhaust emissions. The cooling alternatives described above may not be required or desirable in an engine utilizing such high temperature specialty materials.

OPERATION

The present rotary engine utilizes a cylindrical rotary piston component with multiple symmetrically undulating frontal surfaces on both ends which is axially rotatable within an annular space between interior and exterior cylindrical housing walls while reciprocating between outer positioned annular rings that are affixed to the interior and exterior walls and have symmetrically undulating frontal surfaces wherein frontal surface seal contact is maintained during axial and oscillating rotary piston movement. All components are coaxial providing the rotary piston a controlled circular axial rotation within the annular space, with the outer end rings controlling the horizontal reciprocation.

The cylindrical rotary piston and outer positioned rings are of some width and have equal annular frontal surfaces that are contoured symmetrically to allow transitional movement of the rotary piston between the outer annular rings. This alternately opens a series of chambers on one end while displacing chambers on the opposite end with the oscillating movement during axial rotation of the rotary piston responding in motion against the undulating symmetric frontal surfaces of the outer companion rings.

The axial rotation with reciprocating movement of the rotary piston, with related intake and exhaust ports in the cylindrical housing, provides the cyclical functions for gaseous intake, compression, combustion and exhaust as in a four stroke engine cycle. The cyclical functions of an engine are attained with a minimum of two configured sections of undulating frontal surfaces on both end surfaces of the rotary piston and the outer companion rings surfaces all being symmetric in form and shape. The cyclical functions may be increased by adding multiples of two configured sections (one intake/exhaust and one compression/combustion) to the rotary piston and the outer companion rings, restricted only by desired circumferential motor size and chamber size to achieve power output requirements.

In the preferred engine there are four configured symmetric sections on each annular end surface of the rotary piston and the face of the outer companion annular rings. Two of the configured sections o each rotary piston end surface function as exhaust and intake pistons while the two other configured sections on each rotary piston end surface function as compression and combustion pistons with each configured section alternately following in functional sequence. The rotary piston component, responding in concerted motion with the symmetrically configured four sections of the outer companion rings, will then perform each functional operation (8) eight times on each rotary piston end surface with (8) eight reciprocating functions on the opposite rotary piston end surface resulting in (16) sixteen functional operations of intake, compression, combustion, and exhaust being achieved during one cyclical rotation of the rotary piston.

A rotary engine in accordance with the present invention, with related inlet and outlet ports, will function as a pressurized rotary motor, with pressure injection of fluids, i.e. gases, steam or elements creating pressure, into the displaced chambers on one end of the cylindrical rotor. Thereby causing directional rotation with opposed chamber displacement wherein pressured injection is alternately repeated for continuous rotary movement.

Other applications of the present invention are in the field of compressors and pumps. A power source providing internal or external axial rotation of the rotary piston, with related inlet and outlet ports, will intake, compress, and displace gaseous elements or provide pressurized fluid movement. The present rotary engine, with related inlet and outlet ports, allow combinations of these described functions. The symmetrically configured sections on the rotary piston end surfaces and outer companion rings may be alternated or combined in functions of combustion, pressure injection, compression of gaseous elements, or pressure movement of fluids.

While this invention has been described fully and completely with special emphasis upon a preferred embodiment, it should be understood that within the scope of the appended claims the invention may be practiced otherwise than as specifically described herein.

I claim:

1. A circular rotary engine comprising;
    a generally cylindrical housing having a cylindrical exterior wall and a central cylindrical interior wall concentric therewith defining an annulus therebetween and at least one pair of parallel spaced intermediate transverse walls each having a portion extending radially inward from the annulus and a portion extending radially outward from the annulus to define at least one central compartment intermediate the ends of the housing,
    said central compartment having an inner portion extending radially inward from the annulus and an outer portion extending radially outward from the annulus which are in communication with the annulus, at least one cylindrical rotary piston member rotatably positioned within the inner and outer portion of each said central compartment and having concentric inside and outside extensions disposed within said annulus and extending axially beyond each said central compartment with undulating facial surfaces at each end thereof, a pair of axially spaced end members one at each end of each said rotary piston and within said annulus each having undulating facial surfaces disposed within said annulus facing in axially opposed relation and each of which is rotatably engaged with a separate one of the undulating surfaces at opposite ends of each said rotary piston, whereby each said rotary piston member is constrained between the opposite facing end surfaces for movement in said annulus in a rotating and reciprocating motion to create diametrically opposed alternately opening and closing chambers at opposite ends of each said rotary piston between each pair of engaged facial surfaces upon such motion, a series of circumferentially spaced gaseous or fluid intake and exhaust ports through said housing cylindrical walls in communication with said chambers, and drive means on each said rotary piston member coupled to a drive shaft extending from said housing for imparting or receiving rotary motion.

2. A circular rotary engine according to claim 1 wherein;

each said rotary piston member and said end member undulating surfaces have equal multiples of circumferentially spaced axially gradient sections projected radially from the axial center in multiples of two with one half of each section being a reverse curve configuration and the other half thereof being a companion cam curve configuration with the peaks of the reverse curve surfaces on one end of each said rotary piston axially aligned with the recessed mid-points of the reversed curve and companion cam curve surfaces on the opposite end to create diametrically opposed alternately opening and closing chambers between the engaged surfaces at opposed ends of each said rotary piston and said end members upon relative rotation, said alternately opening and closing chambers operatively disposed relative to said housing interior and exterior wall intake and exhaust ports to provide cyclical intake and/or exhaust and compression and/or combustion functions in combustion engine applications or intake and displacement functions in pump and compressor applications or combinations thereof.

3. A circular rotary engine according to claim 2 wherein;

when there are four reverse curve and companion cam curve configurations on each end of each said rotary piston and said outer end members, two of the reverse curve configurations on each end of each said rotary piston function as exhaust and intake pistons and the other two reverse curve configurations on each end of each said rotary piston function as compression and combustion pistons with each reverse curve configuration alternately following in functional sequence, and said reverse curve and companion cam curve configurations on each end member cooperating therewith to perform intake, compression, combustion, and exhaust functions eight times at each end of each said rotary piston resulting in sixteen functional operations of intake, compression, combustion, and exhaust being achieved during one cyclical rotation of each said rotary piston, said reverse curve and companion cam curve configurations corresponding in number to circumferential engine size whereby increasing their number in multiples of two produce additional functional operations and selective power characteristics, and radial dimensions of said reverse curve and companion cam curve configurations selectively determine circumferential engine size.

4. A circular rotary engine according to claim 3 wherein;

when a said rotary piston is in the open position on one end, the peaks of said reverse curve configurations of each said end member are axially opposed with the peaks of the reverse curve portion on said one end of said rotary piston abutting the peaks of one end member and the axially opposed reverse curve portions between said abutting peaks forming four open chambers therebetween, and the peaks of the reverse curve on the opposite end of said rotary piston are abutting the mid-point of the recess of the reverse curve and companion cam curve portion of the opposed abutting end member forming four substantially closed chambers therebetween, and upon relative rotation the peaks of said one end of said rotary piston move from alignment with the peaks of said abutting end member toward the recessed mid-points of the reverse curve and companion cam curve of said abutting end member following its cam curve portions and the reverse curve portions on the opposite end of said rotary piston moving over the reverse curves of said opposed abutting end member such that the previously open chambers are partially compressed and displaced with the alternate peaks of said rotary piston causing compression in alternating chambers at said one end of said rotary piston and other alternating chambers at same said end of said rotary piston displacing exhausted combustible gases or fluids through said exhaust ports in said housing walls, and the peaks of said opposite end of said rotary piston move from the recessed mid-points of said opposed abutting end member reverse curves toward the peak portions of same said abutting end member following its reverse curve portions such that the previously substantially closed chambers are partially opened causing partial volume from pressure/combustion expansion in alternating chambers at said opposite end of said rotary piston and other alternating chambers at same said opposite end of said rotary piston drawing in combustible gases or fluids through said intake ports in said housing walls, and said rotary piston responding to directional combustion pressure thrust completes the alternating cycle to a closed position after all four chambers at said one end of said rotary piston have fully completed compression and exhaust functions and all four chambers at said opposite end of said rotary piston have fully completed intake and combustion pressure thrust functions, wherein the rotational motion of said rotary piston between said end members is a radial projection of the companion cam curve surface configuration of said rotary piston in a reverse alternating configuration as said rotary piston passes between the aligned radial peaks of said end members.

5. A circular rotary engine according to claim 4 wherein;

said rotary piston member and said abutting end member undulating surfaces form a compression or pressurization compartment on the cam curve side of the chambers with full closure on the reverse curve side of the chambers of said rotary piston and the abutting end member, and provide directional thrust to said rotary piston with combustion of compressed gaseous vapors in the residual compartment between aligned cam curves of said rotary piston and the abutting end member while the reverse curves of said rotary piston and abutting end member are seated in a closed position.

6. A circular rotary engine according to claim 1 in which;

each of said rotary piston undulating end surfaces are affixed within a pair of spaced concentric inner and outer labyrinth sleeves which define two cylindrical extensions of each said rotary piston, one to each axial side of each said rotary piston undulating surfaces and extending axially therebeyond within said housing annulus and the outer ends thereof slidably received one on each axial side of the opposite facing undulating surface of each said abutting end member to provide a labyrinth encasement of said opening and closing chambers, the side walls of said inner and outer labyrinth sleeves rotatably and reciprocally disposed relative to the annulus side walls of said housing interior and exterior walls, a series of circumferentially spaced gaseous or fluid intake and exhaust ports through the side walls of said inner and outer labyrinth sleeves and spaced relative to said housing interior and exterior wall intake and exhaust ports and said chambers to establish gaseous or fluid communication therewith upon relative rotation and reciprocation of each said rotary piston, chamber seal means between the axial sides of each said end member undulating surface and the outer ends of said inner and outer labyrinth sleeves to form a continuous rotary and reciprocal sealing relation therewith, said chamber seal means surrounding said chambers formed between the undulating surfaces of said abutting end members and the opposite ends of each said rotary piston, and labyrinth seal means between the annulus surfaces of the interior and exterior walls of said housing and the inner and outer labyrinth sleeves of each said rotary piston to form a rotary and reciprocal sealing relation therebetween, said labyrinth seal means isolating said intake and exhaust ports of said housing interior and exterior walls and said intake and exhaust ports of said inner and outer labyrinth sleeves.

7. A circular rotary engine according to claim 4 including;

passageways through each said rotary piston extending between the undulating surfaces of each end of said rotary piston to communicate diametrically opposed chambers formed at one end with circumferentially offset diametrically opposed chambers formed on its opposite end, whereby diametrically opposed chambers formed between the undulating surfaces of one said end member and one end of said abutting rotary piston are in communication on their exhaust stroke to discharge exhausted gases to diametrically opposed circumferentially offset chambers formed between the undulating surfaces of the other said end member and the opposite end of said rotary piston on their intake stroke to provide additional thrust from cross pressurized exhaust gases for a second compression/combustion cycle of said exhaust gases.

8. A circular rotary engine according to claim 7 wherein;

said chambers on one end of said rotary piston being of low compression volume while chambers on the opposite end of said rotary piston are high compression volume such that the second combustion cycle of exhaust gases provides increased fuel efficiency and reduced carbon dioxide in the exhaust and allows improved filtration of exhaust toxics and particles with existing engine emission environmental control systems.

9. A circular rotary engine according to claim 1 in which;

said drive means on each said rotary piston comprises a ring gear on the interior diameter of said rotary piston, and a drive gear within each said central compartment inner portion engaged with said ring gear and a drive shaft coupled thereto and extending outward from said housing for imparting or receiving rotary motion.

10. A circular rotary engine according to claim 9 in which;

said rotary piston interior ring gear is engaged with said drive gear in a longitudinal offset direction toward one end member whereby the point of engagement of the teeth of said interior ring gear with the teeth of said drive gear will move longitudinally in increasing and decreasing increments following the rotational and reciprocal motion of said rotary piston as said rotary piston rotates and reciprocates.

11. A circular rotary engine according to claim 1 in which;

said drive means on each said rotary piston comprises fluid torque converter fan blades on the interior diameter of each said rotary piston, and a fluid transmission operatively coupled with said torque converter blades and extending outward from said housing for imparting rotary motion.

12. A circular rotary engine according to claim 1 in which;

said drive means on each said rotary piston comprises a ring gear on the interior diameter of each said rotary piston, and a geared transmission operatively coupled with said ring gear and extending outward from said housing for imparting rotary motion.

13. A circular rotary engine according to claim 4 including;

a flywheel guide flange extending radially outward from the circumference of each said rotary piston and rotatably journalled within the outer portion of said central compartment and having a toothed outer periphery engaged with a drive gear coupled to a shaft extending outward from said housing for imparting or receiving rotary motion, said flywheel guide flange having an undulating configuration substantially following the alternating reverse cam curve configuration as radially projected from the undulating facial cam surfaces at the ends of said rotary piston thereby maintaining clearance tolerances between said undulating surfaces of each said rotary piston and said abutting end members, said flywheel guide flange being of sufficient diameter and weight such its rotational momentum will impart rotary inertia for directional torque thrust and maintain controlled reciprocating rotary movement of said rotary piston.

14. A circular rotary engine according to claim 13 wherein
said flywheel guide flange rotary inertia allows reduction in said rotary piston compression/combustion functions during operation at a determined sustained speed and venting of compression cycles in alternating chambers on each end of said rotary piston member to provide reduction in fuel consumption without loss to engine operational performance output and additional cooling of the engine.

15. A circular rotary engine according to claim 14 wherein;
said rotary engine alternating chambers function as compression cycles as in a compressor or pump in combination with alternating rotary piston functions of intake/compression and combustion/exhaust during engine operation.

16. A circular rotary engine according to claim 13 including;
facial seal means on the inwardly facing undulating facial surfaces of said end members separating the opening and closing chambers and forming a rotary sealing relation with said rotary piston undulating facial surfaces, and each said rotary piston undulating facial surfaces contact only said facial seal means as controlled by said flywheel guide flange to allow finite setting of clearance tolerances between each said rotary piston undulating facial surfaces and each said end member undulating facial surfaces and to selectively vary the compression ratios within said chambers, whereby various high compression fuels and fuel mixtures may be utilized in the engine.

17. A circular rotary engine according to claim 13 in which;
said flywheel guide flange peripheral surface is engaged with said drive gear in a longitudinal offset direction toward one end member whereby the point of engagement of the teeth of said flange surface with the teeth of said drive gear will move longitudinally in increasing and decreasing increments following the rotational and reciprocal motion of said rotary piston as said rotary piston rotates and reciprocates.

18. A circular rotary engine according to claim 17 in which;

each said central compartment is provided with seal means between the inner and outer housing walls and the inner and outer axial surfaces of each said rotary piston to form a rotary and reciprocal fluid sealing relation therebetween, each said compartment outer portion is partially filled with a fluid lubricant, and said flywheel guide flange outer periphery rotates and reciprocates within each said compartment outer portion through the lubricant to circulate the lubricant within said compartment outer portion and between said compartment seal means to lubricate the annulus surfaces and said rotary piston axial surfaces between said compartment seal means.

19. A circular rotary engine according to claim 18 including;
conduits extending between the interior and exterior surfaces of said rotary piston inner and outer labyrinth sleeves to communicate the lubricant in said compartment with the interior diameter of each said rotary piston to provide lubricant to said internal gear and said drive gear engaged therewith.

20. A circular rotary engine according to claim 10 in which;
each said central compartment is provided with seal means between the inner and outer housing walls and the inner and outer axial surfaces of each said rotary piston to form a rotary and reciprocal fluid sealing relation therebetween, said compartment inner portion is partially filled with a fluid lubricant, and said rotary piston interior ring gear rotates and reciprocates within said compartment inner portion through the lubricant to circulate the lubricant within said compartment inner portion and between said compartment seal means to lubricate the annulus surfaces and said rotary piston axial surfaces between said compartment seal means.

21. A circular rotary engine according to claim 6 in which;
said labyrinth seal means is configured in a circumferential undulating pattern following the general line of motion of said intake and exhaust ports on said housing interior and exterior walls and said rotary piston labyrinth sleeves during rotational and reciprocal motion of each said rotary piston, and said labyrinth seal means comprises a pair of parallel longitudinally spaced circumferential compression rings with inside fluid seals adjacent to said intake and exhaust ports with cross connecting seal portions between each exhaust and intake port to provide isolation of exhaust and intake functions.

22. A circular rotary engine according to claim 21 in which;
said chamber seal means comprises a pair of parallel spaced compression rings recessed in the inner and outer axial surfaces of said end members and configured in a circumferential undulating pattern following the general line of said end member undulating surfaces and slidably receiving said rotary piston labyrinth sleeves thereby providing sealing and encasement of said opening and closing chambers, and a series of facial surface seal members interlocked with said undulating compression rings and extending axially from the tangent point of the reverse curves to the peaks of the reverse curves on the facial surfaces of said end members.

23. A circular rotary engine according to claim 6 in which;
 certain ones of said intake and exhaust ports in said housing interior and exterior walls cooperate with certain ones of said intake and exhaust ports in said inner and outer labyrinth sleeves of said rotary piston to draw air into and circulate the air within the internal surface areas of each said rotary piston and said housing during rotation and reciprocation of said labyrinth sleeves relative to said housing interior and exterior walls to provide internal air cooling circulation during alternating and opposing intake, compression/combustion, and exhaust cycles of said undulating surfaces.

24. A circular rotary engine according to claim 23 in which;
 certain ones of said intake and exhaust ports through said housing interior and exterior walls comprise a series of slots arranged in a diagonal spiral pattern relative to the longitudinal axis, and
 certain ones of said intake and exhaust ports through said rotary piston inner and outer labyrinth sleeves comprise a series of slots arranged in a spiral pattern relative to the longitudinal axis and in a circumferential relation relative to the slots in said housing interior and exterior walls, whereby
 air is drawn into and circulated within the internal surface areas of each said rotary piston and said housing during rotation and reciprocation of said labyrinth sleeves relative to said housing interior and exterior walls to provide internal air cooling circulation with alternating and opposing intake, compression/combustion, and exhaust cycles of said undulating surfaces, and
 to provide a pressurized cushion of air between the inner and outer surfaces of said rotary piston labyrinth sleeves and said annular surfaces of said housing interior and exterior walls and on the surface area between said compartment seal means and said labyrinth seal means during alternating and opposing intake, compression/combustion, and exhaust cycles of said undulating surfaces.

25. A circular rotary engine according to claim 23 in which;
 the outer surfaces of said housing interior and exterior walls are finned in the areas surrounding the interior chamber areas formed between the undulating surfaces of said rotary piston and said end members to aid in dissipating engine heat generated by the rotating and reciprocating members.

26. A circular rotary engine according to claim 23 including;
 manifold means on said housing in communication with the ends of the interior of said housing for directing pressurized air expelled thereinto through a combustible fuel mixing chamber and conducting the pressurized fuel mixture into certain ones of said intake ports on said housing exterior wall.

27. A circular rotary engine according to claim 23 including;
 water jacket means on said housing interior and exterior walls in the area surrounding the interior chamber areas formed between the undulating surfaces of said rotary piston and said end members to aid in dissipating engine heat generated by the rotating and reciprocating members.

28. A circular rotary engine according to claim 6 wherein;
 said intake ports are connected to a combustible fuel source and mixing chamber for supplying a combustible fuel mixture into said intake ports,
 said end members have fuel ignition means installed therein in communication with said chambers formed between the undulating surfaces of said end members and the opposite ends of said rotary piston,
 said ignition means operatively coupled with timed firing means for causing said ignition means to ignite said combustible fuel mixture in alternating compressed chambers,
 the axial rotation and reciprocal movement of each said rotary piston creates alternately opening and closing chambers operatively disposed relative to said housing interior and exterior wall intake and exhaust ports provides cyclical functions for gaseous fuel intake, compression, combustion and exhaust in the manner of an internal combustion engine.

29. A circular rotary engine according to claim 28 wherein;
 said engine is comprised of multiple rotary pistons by modular connections of single rotary engine assemblies, and
 said multiple rotary pistons are synchronized for opposed alternating functions of intake/compression and combustion/exhaust to suppress oscillation effects during engine operation.

30. A circular rotary engine according to claim 29 wherein;
 said multiple rotary pistons are synchronized for opposed alternating functions wherein
 said rotary pistons counter rotate to provide counter rotating drive shafts at opposite ends of said rotary engine.

31. A circular rotary engine according to claim 28 wherein;
 said engine has a center rotary piston affixed within inner and outer housings to remain stationary wherein,
 end member components are synchronized for opposed alternating rotational functions of intake/compression and combustion/exhaust wherein
 said rotation of end members form intake and compression chambers between the outer extremities of said end members and the outer end housing walls during cyclical engine functions wherein
 engine oscillation effects are suppressed by opposed alternating engine cyclical functions.

32. A circular rotary engine according to claim 28 wherein;
 said rotary piston is center divided into separate rotating components which are synchronized for opposed alternating functions of intake/compression and combustion/exhaust wherein
 said divided rotary piston components form a central intake and compression chamber between their center facial surfaces during cyclical engine functions wherein
 engine oscillation effects are suppressed by opposed alternating engine cyclical functions.

33. A circular rotary engine according to claim 1 wherein;

said housing, said rotary piston member, and said end members are formed of high temperature ceramic composite materials to provide high temperature engine performance with increased fuel burning efficiencies, thereby reducing exhaust emissions.

34. A circular rotary engine according to claim 1 wherein;

said drive means is connected to an external source of rotary motion to impart axial rotation to each said rotary piston, and the axial rotation and reciprocal movement of each said rotary piston creates alternately opening and closing chambers operatively disposed relative to said housing interior and exterior wall intake and exhaust ports provides cyclical functions for fluid intake, compression, and displacement in the manner of a compressor or fluid pump.

* * * * *